US008635483B2

(12) United States Patent
Acar et al.

(10) Patent No.: US 8,635,483 B2
(45) Date of Patent: Jan. 21, 2014

(54) DYNAMICALLY TUNE POWER PROXY ARCHITECTURES

(75) Inventors: Emrah Acar, Montvale, NJ (US); Pradip Bose, Yorktown Heights, NY (US); Bishop C. Brock, Coupland, TX (US); Alper Buyuktosunoglu, White Plains, NY (US); Michael S. Floyd, Cedar Park, TX (US); Maria L. Pesantez, Austin, TX (US); Gregory S. Still, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 13/079,842

(22) Filed: Apr. 5, 2011

(65) Prior Publication Data
US 2012/0260117 A1 Oct. 11, 2012

(51) Int. Cl.
G06F 1/00 (2006.01)
G06F 1/26 (2006.01)
G06F 15/00 (2006.01)
G01R 21/00 (2006.01)
G01R 19/00 (2006.01)

(52) U.S. Cl.
USPC ............... 713/340; 713/320; 702/60; 702/64; 712/28

(58) Field of Classification Search
USPC .................. 713/320, 340; 702/60, 64; 712/28
See application file for complete search history.

(56) References Cited

U.S. PATENT DOCUMENTS

| 6,643,128 | B2 | 11/2003 | Chu et al. |
| 7,167,015 | B2 | 1/2007 | Borkar |
| 7,281,140 | B2 * | 10/2007 | Burns et al. .................... 713/300 |
| 7,321,942 | B2 | 1/2008 | Flautner et al. |
| 7,430,672 | B2 | 9/2008 | Rotem et al. |
| 7,533,003 | B2 | 5/2009 | Floyd et al. |
| 7,644,051 | B1 | 1/2010 | Moore et al. |
| 7,689,839 | B2 | 3/2010 | Uguen et al. |

(Continued)

FOREIGN PATENT DOCUMENTS

WO WO2005/017468 A2 2/2005

OTHER PUBLICATIONS

International Search Report and Written Opinion dated Jan. 25, 2013 for International Application No. PCT/US2012/062919, 12 pages.

(Continued)

*Primary Examiner* — Stefan Stoynov
(74) *Attorney, Agent, or Firm* — Francis Lammes; Stephen J. Walder, Jr.; William J. Stock

(57) ABSTRACT

A mechanism is provided for automatically tuning power proxy architectures. Based on the set of conditions related to an application being executed on a microprocessor core, a weight factor to use for each activity in a set of activities being monitored for the microprocessor core is identified, thereby forming a set of weight factors. A power usage estimate value is generated using the set of activities and the set of weight factors. A determination is made as to whether the power usage estimate value is greater than a power proxy threshold value identifying a maximum power usage for the microprocessor core. Responsive to the power usage estimate value being greater than the power proxy threshold value, a set of signals is sent to one or more on-chip actuators in the power proxy unit associated with the microprocessor core and a set of operational parameters associated with the component are adjusted.

21 Claims, 16 Drawing Sheets

(56) References Cited

U.S. PATENT DOCUMENTS

| | | | |
|---|---|---|---|
| 7,840,825 | B2 | 11/2010 | Altevogt et al. |
| 7,904,287 | B2 | 3/2011 | Lefurgy et al. |
| 7,917,772 | B1 | 3/2011 | Koniaris et al. |
| 7,971,073 | B2 | 6/2011 | Hsu et al. |
| 8,041,521 | B2 | 10/2011 | Bletsch et al. |
| 8,214,663 | B2 | 7/2012 | Floyd et al. |
| 8,266,569 | B2* | 9/2012 | Palisetti et al. ............ 716/133 |
| 8,412,479 | B2* | 4/2013 | David et al. ............... 702/85 |
| 2004/0206101 | A1 | 10/2004 | Bash et al. |
| 2005/0273208 | A1 | 12/2005 | Yazawa et al. |
| 2006/0052970 | A1 | 3/2006 | Arabi et al. |
| 2006/0090086 | A1* | 4/2006 | Rotem et al. ............ 713/300 |
| 2006/0168571 | A1 | 7/2006 | Ghiasi et al. |
| 2006/0178764 | A1 | 8/2006 | Bieswanger et al. |
| 2008/0234953 | A1 | 9/2008 | Ignowski et al. |
| 2008/0278905 | A1 | 11/2008 | Artman et al. |
| 2009/0138219 | A1 | 5/2009 | Bletsch et al. |
| 2009/0259869 | A1 | 10/2009 | Naffziger |
| 2009/0296342 | A1 | 12/2009 | Matteson et al. |
| 2010/0049995 | A1 | 2/2010 | Casey et al. |
| 2010/0218029 | A1 | 8/2010 | Floyd et al. |
| 2010/0268930 | A1 | 10/2010 | Bose et al. |
| 2010/0268974 | A1 | 10/2010 | Floyd et al. |
| 2010/0268975 | A1 | 10/2010 | Bose et al. |
| 2011/0231030 | A1 | 9/2011 | Carter et al. |

OTHER PUBLICATIONS

Notice of Allowance mailed Feb. 7, 2013 for U.S. Appl. No. 12/726,792; 12 pages.

U.S. Appl. No. 12/726,792.

U.S. Appl. No. 13/288,346.

U.S. Appl. No. 13/488,822.

U.S. Appl. No. 13/608,285.

Economou, Dimitris et al., "Full-System Power Analysis and Modeling for Server Environments", Stanford University, Workshop on Modeling Benchmarking and Simulation, 2006, 8 pages.

Jacobson, Hans et al., "Abstraction and Microarchitecture Scaling in Early-Stage Power Modeling", IEEE, 2011, pp. 394-405.

Lee, Seung Eun et al., "A variable frequency link for a power-aware network-on-chip (NoC)", Integration, The VLSI Journal, v. 42, pp. 479-485, Jan. 2009, pp. 479-485.

Pakbaznia, Ehsan et al., "Minimizing Data Center Cooling and Server Power Costs", Proceedings of the 14th ACM/IEEE International Symposium on Low Power Electronics and Design, 2009, pp. 145-150.

Powell, Michael D. et al., "CAMP: A Technique to Estimate Per-Structure Power at Run-time using a Few Simple Parameters", IEEE, 2008, pp. 289-300.

Shin, Donghwa et al., "Energy-Optimal Dynamic Thermal Management for Green Computing", ACM, ICCAD '09, Nov. 2-5, 2009, 6 pages.

Snowden, David, "Operating System Directed Power Management", Thesis, School of Computer Science and Engineering at The University of New South Wales, Mar. 4, 2010, 237 pages.

Wang, Zhikui et al., "Optimal Fan Speed Control for Thermal Management of Servers", Proceedings of the ASME/Pacific Rim Technical Conference and Exhibition on Packaging and Integration of Electronic and Photonic Systems, MEMS, and NEMS InterPACK'09, San Francisco, California, Jul. 19-23, 2009, 11 pages.

U.S. Appl. No. 12/424,158.

U.S. Appl. No. 12/424,161.

U.S. Appl. No. 12/749,179.

"Use of Instrumented Activity Counts to Identify Relevant Code Points for Performance Analysis and Tuning", www.IP.com No. IPCOM000184039D, Jun. 9, 2009, 7 pages.

Joseph, Russ, et al., "Run-time Power Estimation in High-Performance Microprocessors", Proceedings of the International Symposium on Low Power Electronics and Design (ISLPED), Aug. 6-7, 2002, 6 pages.

Zhang, Lide, et al., "Process Variation Characterization of Chip-Level Multiprocessors", 2009 46th ACM/IEEE Design Automation Conference (DAC), 2009, pp. 694-697.

* cited by examiner

DYNAMICALLY TUNE POWER PROXY ARCHITECTURES

The present application relates generally to an improved data processing apparatus and method and more specifically to mechanisms for automatically tuning power proxy architectures.

Effective power management in microprocessors requires a run-time measurement of power. However, the measurement of real, calibrated power consumption in hardware is often a difficult and complex task which may involve stalling the processor for proper calibration. In addition, the need to isolate power consumption at the chiplet level (combination of a core, level 2 (L2) cache, and level 3 (L3) cache) using only chip level power measurements exacerbates the problem. POWER7® implements such a hardware mechanism in the form of power proxy architectures. This power proxy architecture forms an estimate of per chiplet power consumption within a multi-core microprocessor chip by using a specially-architected, programmably weighted counter-based architecture that monitors specific activities and forms an aggregate value. The activity event counters in the processor core, L2 cache, and L3 cache are each multiplied by a programmable "weight" and then added together into a single composite activity value. Events are carefully selected such that those that correlate maximally with active power consumption are captured. By selectively weighting the different events relative to one another based on empirical post-silicon correlation work, the amount of current consumed by the chiplet may then be estimated with an acceptable level of accuracy.

In known solutions, the programmable aspects of power proxy architecture are fixed during post-silicon measurement-based calibration methodology stage (static approach). The post-silicon measurement-based calibration follows a systematic methodology. First, sample points are collected for a series of targeted benchmarks such that all the power proxy events are represented. Each sample point contains a power measurement (for the core and the L2 and L3 caches) a count for each activity event. For the duration of the workloads, sample points are taken at a rate of certain time granularity per sample. Once the data is gathered and post-processed, an algorithm is run to determine all the power proxy settings. The algorithm finds the best least-squares type curve fit to real power from all the possible linear equations that may be formed with the available hardware.

Clearly, the static approach sets the programmable elements of the power proxy architecture at initial program load (IPL) time and these values are not changed during the machine life time. Furthermore, the static approach relies on a pre-fixed model such as a lumped linear model with weighted sum of all the collected activities.

SUMMARY

In one illustrative embodiment, a method, in a data processing system, is provided for automatically tuning power proxy architectures. The illustrative embodiment identifies a set of conditions related to an application being executed on a microprocessor core. Based on the set of conditions, the illustrative embodiment identifies a weight factor to use for each activity in a set of activities being monitored for the microprocessor core, thereby forming a set of weight factors. The illustrative embodiment generates a power usage estimate value using the set of activities and the set of weight factors. The illustrative embodiment determines whether the power usage estimate value is greater than a power proxy threshold value identifying a maximum power usage for the microprocessor core. Responsive to the power usage estimate value being greater than the power proxy threshold value, the illustrative embodiment sends a set of signals to one or more on-chip actuators in the power proxy unit associated with the microprocessor core. The illustrative embodiment adjusts a set of operational parameters associated with the component in order to meet the defined power target value.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As opposed to the static approach currently utilized in power proxy architectures, better accuracy may be achieved if the programmable aspects of the power proxy architectures are adapted based on the phases of application execution as well as across different application executions. In addition, it is possible to utilize piece-wise linear models based on the performance feedback of the application to further improve the accuracy. Thus, the illustrative embodiments provide for dynamic adaptation of power proxy architectures. In other words, in addition to static approach, the illustrative embodiments provide mechanisms for dynamically adapting power proxy architectures across different applications as well as within an application.

Figure 1:
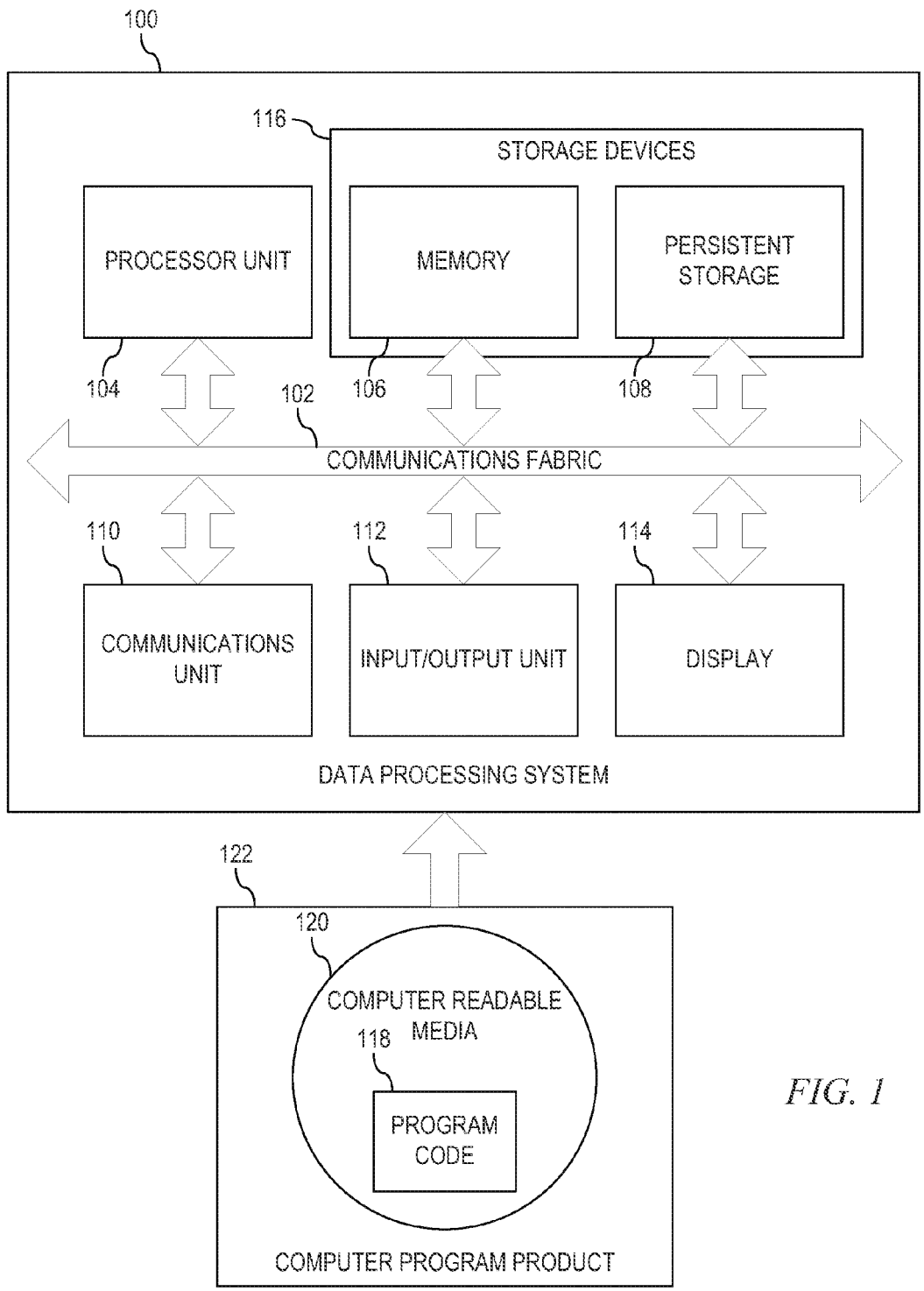
FIG. 1 depicts a block diagram of a data processing system in which illustrative embodiments may be implemented.
Figure 2:
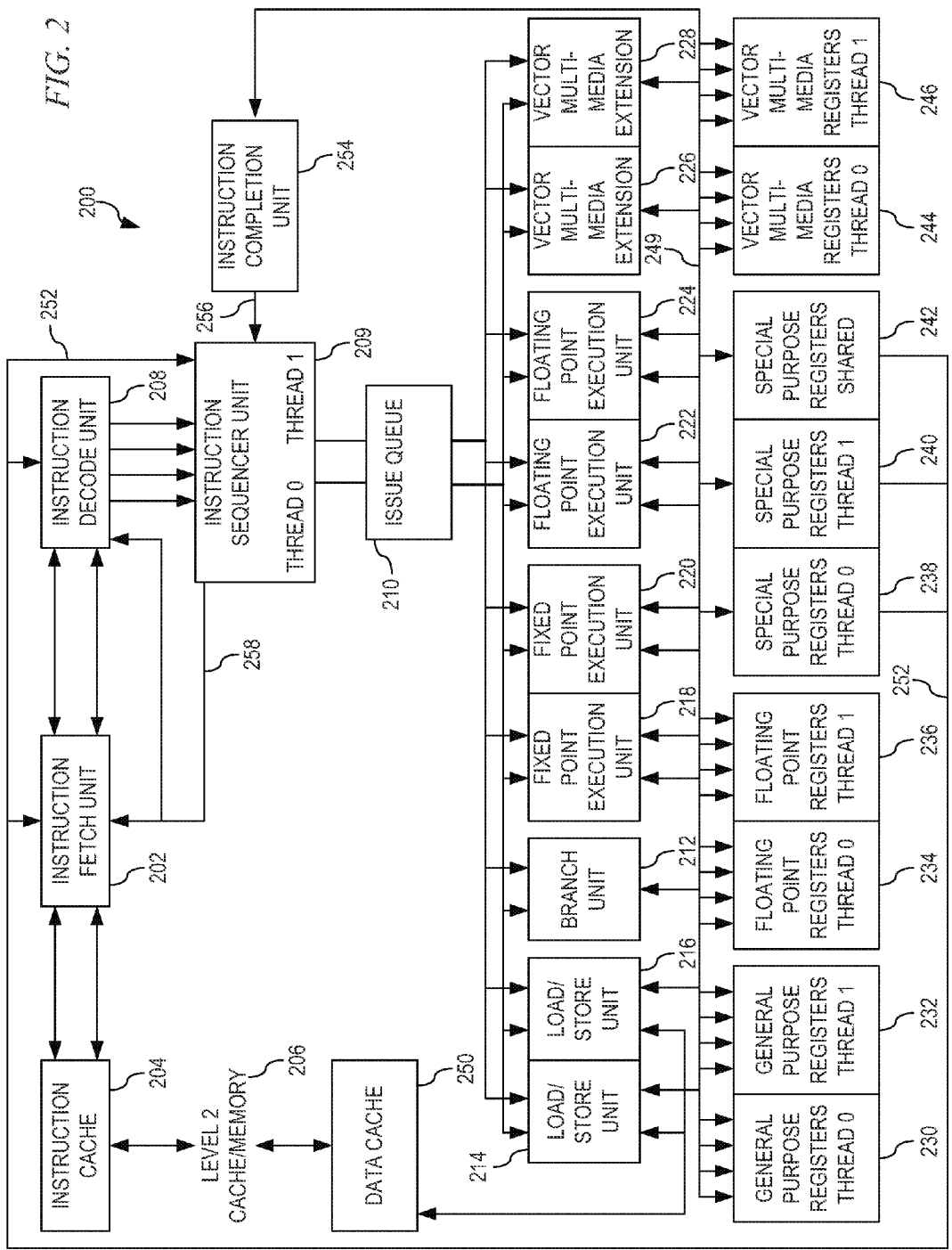
FIG. 2 depicts an exemplary block diagram of a conventional dual threaded processor design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of using power proxies combined with on-chip actuators to meet a defined power target, this is only an example and is not intended to state or imply any limitation with regard to the features of the present invention. To the contrary, the illustrative embodiments are intended to include distributed data processing environments and embodiments in which power proxies combined with on-chip actuators may be used to meet a defined power target.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or nonvolatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form. In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional dual threaded processor design showing functional units and registers is depicted in accordance with an illustrative embodiment. Processor 200 may be implemented as processing unit 104 in FIG. 1 in these illustrative examples. Processor 200 comprises a single integrated circuit superscalar microprocessor with dual-thread simultaneous multithreading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 16, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. MIA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. White processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Figure 3:
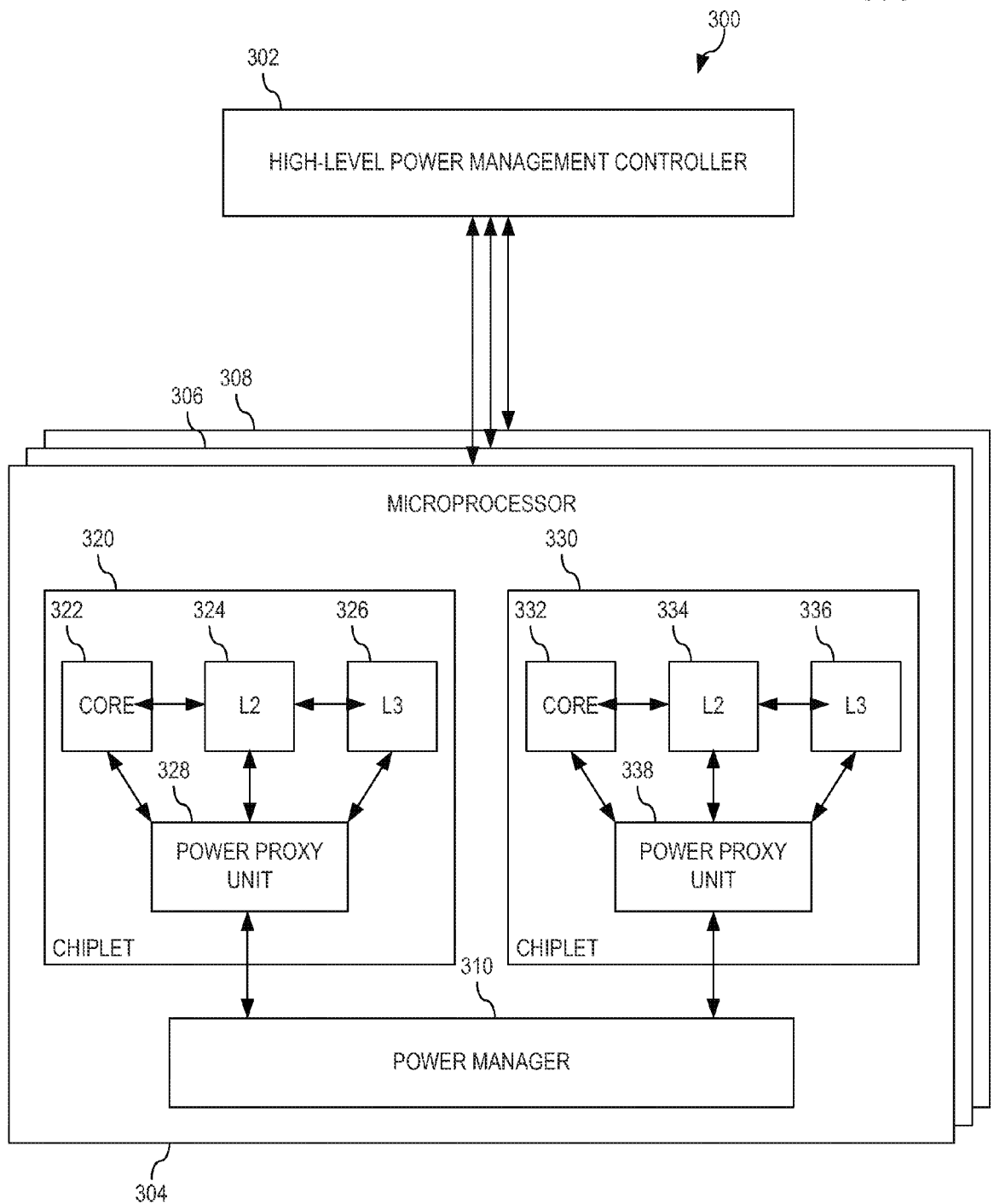
FIG. 3 illustrates an exemplary data processing system comprising a high-level power management controller in accordance with an illustrative embodiment.

FIG. 3 illustrates an exemplary data processing system comprising a high-level power management controller in accordance with an illustrative embodiment. Data processing system 300 comprises high-level power management controller 302 and a set of microprocessors 304, 306, and 308. During the execution of applications or software on data processing system 300, high-level power management controller 302 monitors various conditions associated with a set of components on each of microprocessors 304, 306, and 308. The various conditions may comprise the voltage consumed by each component, the temperature of areas associated with each of the components, voltage leakage associated with each of the components, or the like.

One example of monitoring the temperature of areas associated with each of the components, high-level power management controller 302 monitors a set of thermal sensors (not shown) associated with one or more components in each of microprocessors 304, 306, and 308. Each of the thermal sensors may be positioned adjacent to areas within the component that typically experience the greatest rise in temperature during the execution of most applications. An example of monitoring voltage consumed by each component, high-level power management controller 302 may monitor power proxy power usage estimate values from each of power proxy units 328 and 338, which are stored in power manager 310 as is described in detail below. One example of monitoring voltage leakage associated with each of the components, high-level power management controller 302 may monitor voltage leakage by using special circuitry (not shown) for Iddq (leakage current) measurements on-chip and under controlled conditions to isolate leakage power from active power.

In order to dynamically adapt power proxy architectures across different applications as well as within an application, the illustrative embodiment may use a combination of (i) offline characterization of chip regions for leakage characteristics and (ii) online computation of leakage power values for each region based on voltage, temperature in region, parameters determined from off-line characterization, or the like. That is, voltage leakage may be computed mathematically as a function of voltage, temperature, transistor characteristics, or the like for that region. Alternatively, the illustrative embodiments may use took-up tables indexed by voltage and temperature values, with the power in the table entries populated by offline characterization or based on design. The above are only examples of ways high-level power management controller 302 may monitor temperature, voltage consumption, and voltage leakage. One of ordinary skill in the art would realize that there are other ways to monitor temperature, voltage consumption, and voltage leakage without departing from the spirit and scope of the invention.

High-level power management controller 302 monitors the temperature, voltage consumption, and voltage leakage of each component and uses the gathered information, along with a power scheme for data processing system 300 to determine a power proxy threshold value to meet a defined target for each component. High-level power management controller 302 then sets or adjusts a power proxy threshold value for each of the monitored components in power manager 310 of each of microprocessors 304, 306, and 308.

Each of microprocessors 304, 306, and 308 comprises power manager 310 and chiplets 320 and 330. A chiplet is a processor core plus some memory cache, such as an L2, L3, or L4 memory cache, or some combination thereof. Chiplet 320 comprises core 322, L2 cache 324, L3 cache 326, and power proxy unit 328. Chiplet 330 comprises core 332, L2 cache 334, L3 cache 336, and power proxy unit 338. While FIG. 3 shows microprocessors 304, 306, and 308 as comprising two (2) chiplets, alternate illustrative embodiments contemplate microprocessors 304, 306, and 308 as comprising any number of chiplets, from one to several.

In some illustrative embodiments, power proxy units 328 and 338 track activity metrics on a per-chiplet basis, while in other illustrative embodiments, power proxy units 328 and 338 track the metrics on a per thread basis. Activity counters within each of power proxy units 328 and 338 track activities in cores 322 and 332, L2 cache 324 and 334, and L3 cache 326 and 336, respectively, and reset on activity read from the power proxy unit. Each of power proxy units 328 and 338 count each of these activities in a counter. Power proxy units 328 and 338 multiply the individual counts by a dynamically set weight factor specific to that particular activity to reach a value and store the value in an activity counter. A description of how the various weights associated with the various activity counters are dynamically determined and set will be described in detail below. A weight may be any value other than zero. In an illustrative embodiment, the weight factor comprises four bits. In other illustrative embodiments, the weight factor may be comprised of any number of bits.

Power proxy units 328 and 338 monitor a set of counters. Whenever an activity specified to be monitored occurs, power proxy unit 328 or 338 adds a value equal to a dynamically set weight associated with the activity to a counter. The counter is associated with one activity only. Then, periodically, the values held in the set of counters monitored by power proxy units 328 and 338 are collected by power proxy units 328 and 338. Power proxy units 328 and 338 each add these collected values together to arrive at a power usage estimate value for the unit monitored by each of power proxy units 328 and 338. Power proxy units 328 and 338 send these power usage estimate values to power manager 310.

Power manager 310 compares the power usage estimate value from power proxy units 328 or 338 to the received power proxy threshold value from high-level power management controller 302 for that component. Based on the comparison, power manager 310 sends signals to one or more on-chip actuators (not shown) in power proxy units 328 and 338 in order for power proxy units to adjust operational parameters in order to achieve the power usage goals. The on-chip actuators within each of power proxy units 328 and 338 may control a set of operational parameters, such as frequency, voltage, pipeline instruction rate, and/or the like. A power usage goal may be a specific power usage cap. Based on the estimate, if the power usage is not being exceeded, power manager 310 may send signals for the on-chip actuators in power proxy unit 328 or 338 to increase the frequency, voltage, and/or pipeline instruction rate of the component. If the power usage estimate value exceeds the cap, then the power manager 310 may send signals for the on-chip actuators in power proxy unit 328 or 338 to decrease the frequency, voltage, and/or pipeline instruction rate of the component. Thus, the power manager is self-controlling, based on the power proxy usage estimate values of power proxy units 328 and 338 and the power proxy threshold value for each component received from high-level power management controller 302.

Each of power proxy units 328 and 338 manages a set of counters. The power proxy unit collects the stored values for the set of counters the power proxy units manages in parallel. Further, a single power manager manages a set of power proxy units. Each power proxy has one or more units assigned that the power proxy unit monitors. The power proxy units may then collect values in parallel or independently of each other. Further, the collection period is configurable for each power proxy unit and each power proxy unit may collect the stored values for different periods than every other power proxy managed by a power manager.

Power manager 310 and power proxy units 328 and 338 have memory and a dynamic control module that provides for assigning what specific counters will count what specific activities as well as dynamically determining and setting the weight to the activity based on either phases of application execution, types of application being executed, performance of applications being executed, or the like. As is illustrated above, one of the key programmable elements of the power proxy architecture is the weight assigned to each activity count. For example, in the case where power is defined as $P=\Sigma(W_i*A_i)+C$, where $A_i$ is an activity count, $W_i$ is the associated weight, and $C$ is a constant that may be added, rather than the weights being static as is known in current power proxy architectures, in the illustrative embodiments each of weights (Wi) may be dynamically programmed based on the feedback gathered from the program during run-time. Such a scheme has the advantage of improving accuracy of the power proxy architecture. Additionally, in order to dynamically tune the power proxy architecture during run-time, the illustrative embodiments may use different models for power proxy architecture. That is, assuming an underlying hardware where different models of power approximation are implemented, the dynamic approach may also decide which model to use to have better accuracy. For example, one model may be a linear combination of activity counts such as $\Sigma(Wi^*Ai)+C$, where a second model may be a combination of linear and non-linear activity counts such as $W1^*A1+W2^*\log(A2)+C$. Depending on the model type, a better fit may be possible and the dynamic approach decides which model to use depending on the program phase.

Figure 4:
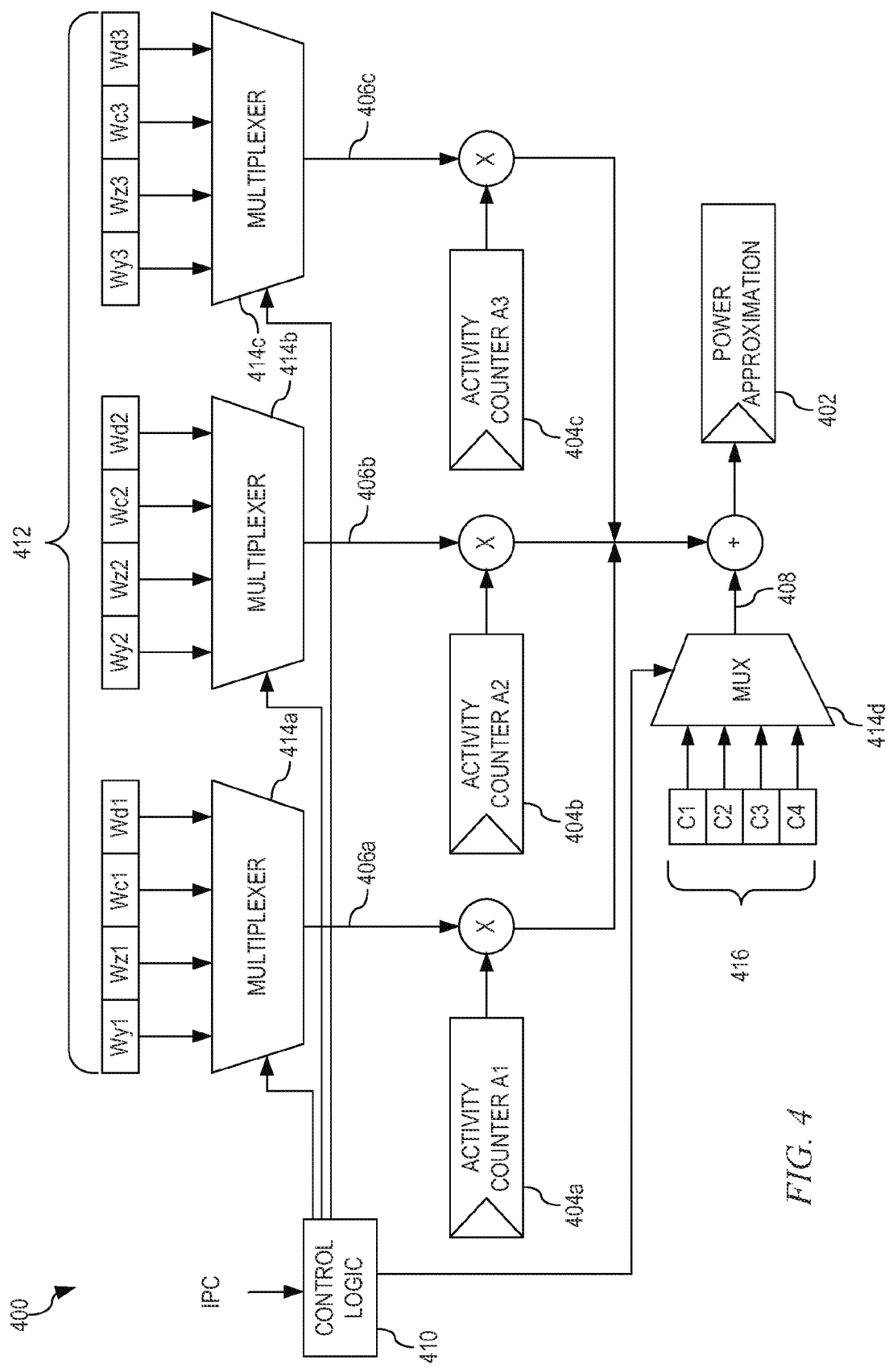
FIG. 4 depicts one example where a selection of a plurality of predetermined weights and a plurality of predetermined constants is made based on conditions within the data processing system in accordance with an illustrative embodiment.

FIG. 4 depicts one example where a selection of a plurality of predetermined weights and a plurality of predetermined constants is made based on conditions within the data processing system in accordance with an illustrative embodiment. For simplicity, this example approximates power 402 from three activity counters 404a, 404b, and 404c, three dynamically selected weights 406a, 406b, and 406c, and one dynamically selected constant value 408. In data processing system 400, control logic 410, from a finite state machine (not shown) of the power proxy unit, such as power proxy units 328 of FIG. 3, receives inputs that correlate to conditions related to the application being executed on the specific core to which the power proxy unit is associated, such as instructions completed per cycle, number of threads in operation, voltage, temperature, voltage leakage, or the like. During execution of the application, control logic 410 receives the input, for example, instructions completed per cycle related to the application being executed. Control logic 410 then determines which weight from a plurality of predetermined weights and which constant from a plurality of predetermined constants should be selected based on the received instructions completed per cycle. That is, for each of activity counters 404a, 404b, and 404c, there are four possible predetermined weights 412 that may be used for power approximation as well as four possible predetermined constants 416 that may be added to the power approximation. Weights Wy1, Wz1, Wc1, and Wd1 are associated with activity counter 404a, weights Wy2, Wz2, Wc2, and Wd2 are associated with activity counter 404b, weights Wy3, Wz3, Wc3, and Wd3 are associated with activity counter 404c, and constants C1, C2, C3, and C4 are constants that may be added to the power approximation.

Depending on the instructions completed per cycle range, four different estimations with different weights and constant values are used for power proxy architecture. For example, if control logic 410 determines that the instructions completed per cycle are less than or equal to a first predetermined value, then control logic 410 may send select signals to multiplexers 414a-414d such that the power for activity counters 404a, 404b, and 404c may be approximated using the following model:

$$P=Wy1^*A1+Wy2^*A2+Wy3^*A3+C1$$

If control logic 410 determines that the instructions completed per cycle are greater than the first predetermined value but less than or equal to a second predetermined value, then control logic 410 may send select signals to multiplexers 414a-414d such that the power for activity counters 404a, 404b, and 404c may be approximated using the following model:

$$P=Wz1^*A1+Wz2^*A2+Wz3^*A3+C2$$

If control logic 410 determines that the instructions completed per cycle are greater than the second predetermined value but less than or equal to a third predetermined value, then control logic 410 may send select signals to multiplexers 414a-414d such that the power for activity counters 404a, 404b, and 404c may be approximated using the following model:

$$P=Wc1^*A1+Wc2^*A2+Wc3^*A3+C3$$

Finally, if control logic 410 determines that the instructions completed per cycle are greater than the third predetermined value, then control logic 410 may send select signals to multiplexers 414a-414d such that the power for activity counters 404a, 404b, and 404c may be approximated using the following model:

$$P=Wd1^*A1+Wd2^*A2+Wd3^*A3+C4$$

While FIG. 4 illustrates only four different instructions completed per cycle ranges, one of ordinary skill in the art will recognize that more or fewer instructions completed per cycle ranges may be used without departing from the spirit and scope of the invention.

Figure 5:
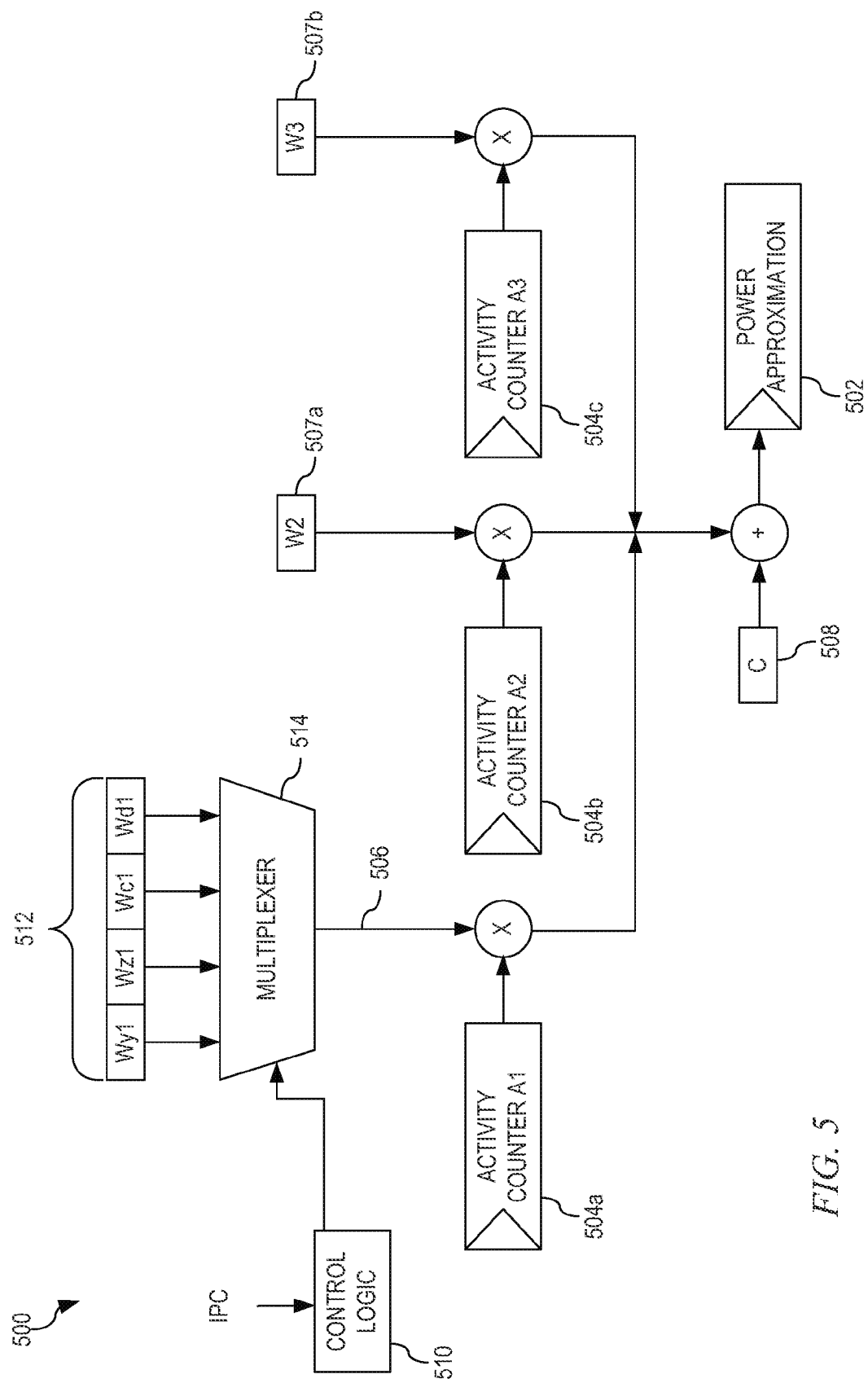
FIG. 5 depicts one example where a selection of a plurality of predetermined weights is made based on conditions within the data processing system while other weights are preset in accordance with an illustrative embodiment.

FIG. 5 depicts one example where a selection of a plurality of predetermined weights is made based on conditions within the data processing system while other weights are preset in accordance with an illustrative embodiment. For simplicity, this example approximates power 502 from three activity counters 504a, 504b, and 504c and one dynamically selected weight 506, while weights 507a and 507b as well as constant 508 are preset. In data processing system 500, control logic 510, from a finite state machine (not shown) of the power proxy unit, such as power proxy units 328 of FIG. 3, receives inputs that correlate to conditions related to the application being executed on the specific core to which the power proxy unit is associated, such as instructions completed per cycle, number of threads in operation, voltage, temperature, voltage leakage, or the like. During execution of the application, control logic 510 receives the input, for example, instructions completed per cycle related to the application being executed. Control logic 510 then determines which weight from a plurality of predetermined weights should be selected based on the received instructions completed per cycle. That is, for activity counter 504a there are four possible predetermined weights 512 (Wy1, Wz1, Wc1, and Wd1) that may be used for power approximation.

Depending on the instructions completed per cycle range, four different estimations with different weights are used for power proxy architecture. For example, if control logic 510 determines that the instructions completed per cycle are less than or equal to a first predetermined value, then control logic 510 may send select signals to multiplexer 514 such that the power for activity counters 504a, 504b, and 504c may be approximated using the following model:

$$P=Wy1^*A1+W2^*A2+W3^*A3+C$$

If control logic 510 determines that the instructions completed per cycle are greater than the first predetermined value but less than or equal to a second predetermined value, then control logic 510 may send select signals to multiplexer 514 such that the power for activity counters 504a, 504b, and 504c may be approximated using the following model:

$$P=Wz1^*A1+W2^*A2+W3^*A3+C$$

If control logic 510 determines that the instructions completed per cycle are greater than the second predetermined value but less than or equal to a third predetermined value, then control logic 510 may send select signals to multiplexer 514 such that the power for activity counters 504a, 504b, and 504c may be approximated using the following model:

$$P=Wc1*A1+W2*A2+W3*A3+C$$

Finally, if control logic 510 determines that the instructions completed per cycle are greater than the third predetermined value, then control logic 510 may send select signals to multiplexer 514 such that the power for activity counters 504a, 504b, and 504c may be approximated using the following model:

$$P=Wd1*A1+W2*A2+W3*A3+C$$

While FIG. 5 illustrates only four different instructions completed per cycle ranges, one of ordinary skill in the art will recognize that more or fewer instructions completed per cycle ranges may be used without departing from the spirit and scope of the invention.

Figure 6:
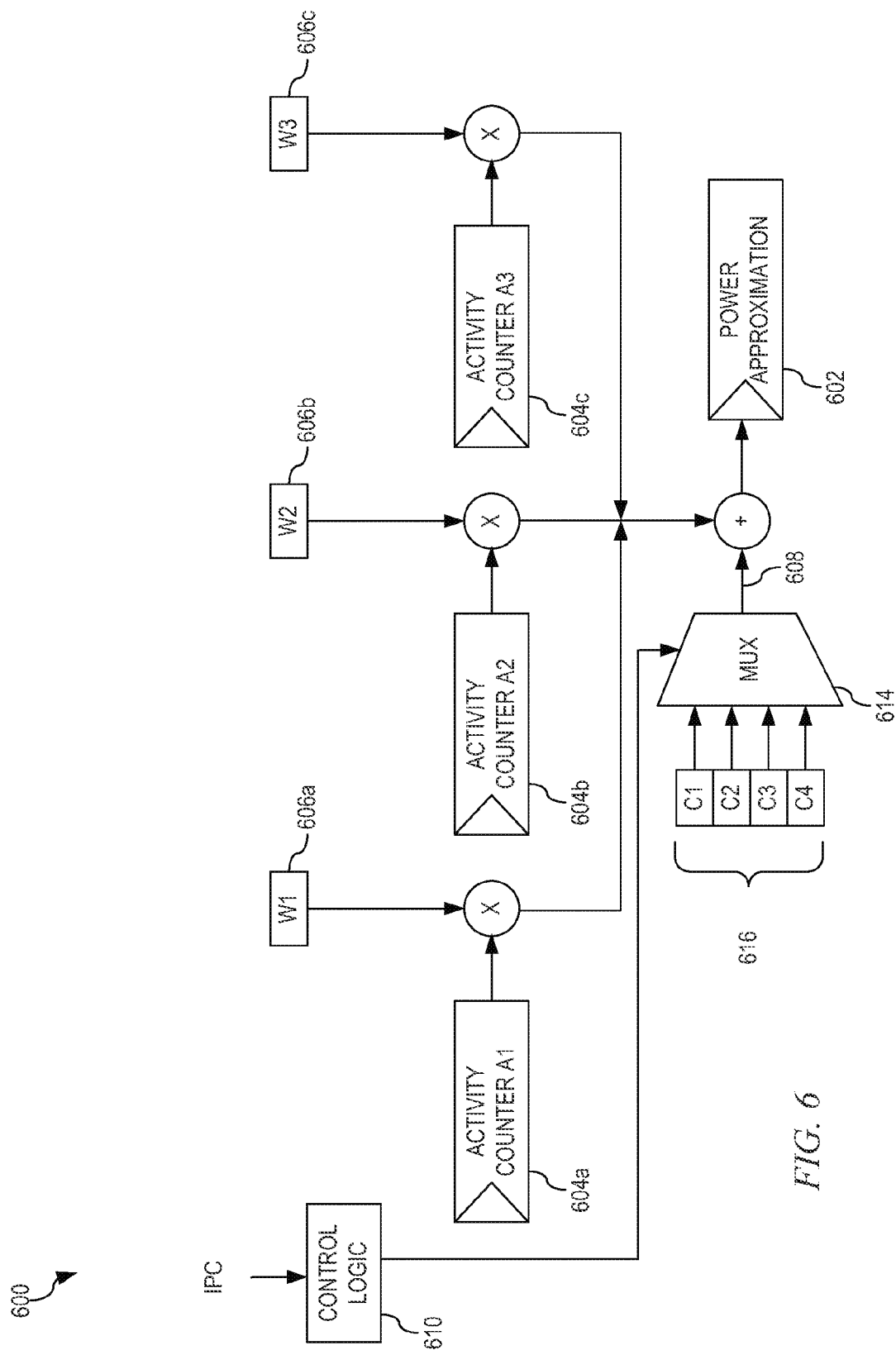
FIG. 6 depicts one example where a selection of a plurality of predetermined constants is made based on conditions within the data processing system in accordance with an illustrative embodiment.

FIG. 6 depicts one example where a selection of a plurality of predetermined constants is made based on conditions within the data processing system in accordance with an illustrative embodiment. For simplicity, this example approximates power 602 from three activity counters 604a, 604b, and 604c and one dynamically selected constant value 608, while weights 606a, 606b, and 606c are preset. In data processing system 600, control logic 610, from a finite state machine (not shown) of the power proxy unit, such as power proxy units 328 of FIG. 3, receives inputs that correlate to conditions related to the application being executed on the specific core to which the power proxy unit is associated, such as instructions completed per cycle, number of threads in operation, voltage, temperature, voltage leakage, or the like. During execution of the application, control logic 610 receives the input, for example, instructions completed per cycle related to the application being executed. Control logic 610 then determines which constant from a plurality of predetermined constants should be selected based on the received instructions completed per cycle. That is, four possible predetermined constants 616, (C1, C2, C3, and C4) that may be added to the power approximation.

Depending on the instructions completed per cycle range, four different constant values are used for power proxy architecture. For example, if control logic 610 determines that the instructions completed per cycle are less than or equal to a first predetermined value, then control logic 610 may send select signals to multiplexer 614 such that the power for activity counters 604a, 604b, and 604c may be approximated using the following model:

$$P=W1*A1+W2*A2+W3*A3+C1$$

If control logic 610 determines that the instructions completed per cycle are greater than the first predetermined value but less than or equal to a second predetermined value, then control logic 610 may send select signals to multiplexer 614 such that the power for activity counters 604a, 604b, and 604c may be approximated using the following model:

$$P=W1*A1+W2*A2+W3*A3+C2$$

If control logic 610 determines that the instructions completed per cycle are greater than the second predetermined value but less than or equal to a third predetermined value, then control logic 610 may send select signals to multiplexer 614 such that the power for activity counters 604a, 604b, and 604c may be approximated using the following model:

$$P=W1*A1+W2*A2+W3*A3+C3$$

Finally, if control logic 610 determines that the instructions completed per cycle are greater than the third predetermined value, then control logic 610 may send select signals to multiplexer 614 such that the power for activity counters 604a, 604b, and 604c may be approximated using the following model:

$$P=W1*A1+W2*A2+W3*A3+C4$$

While FIG. 6 illustrates only four different instructions completed per cycle ranges, one of ordinary skill in the art will recognize that more or fewer instructions completed per cycle ranges may be used without departing from the spirit and scope of the invention.

Figure 7:
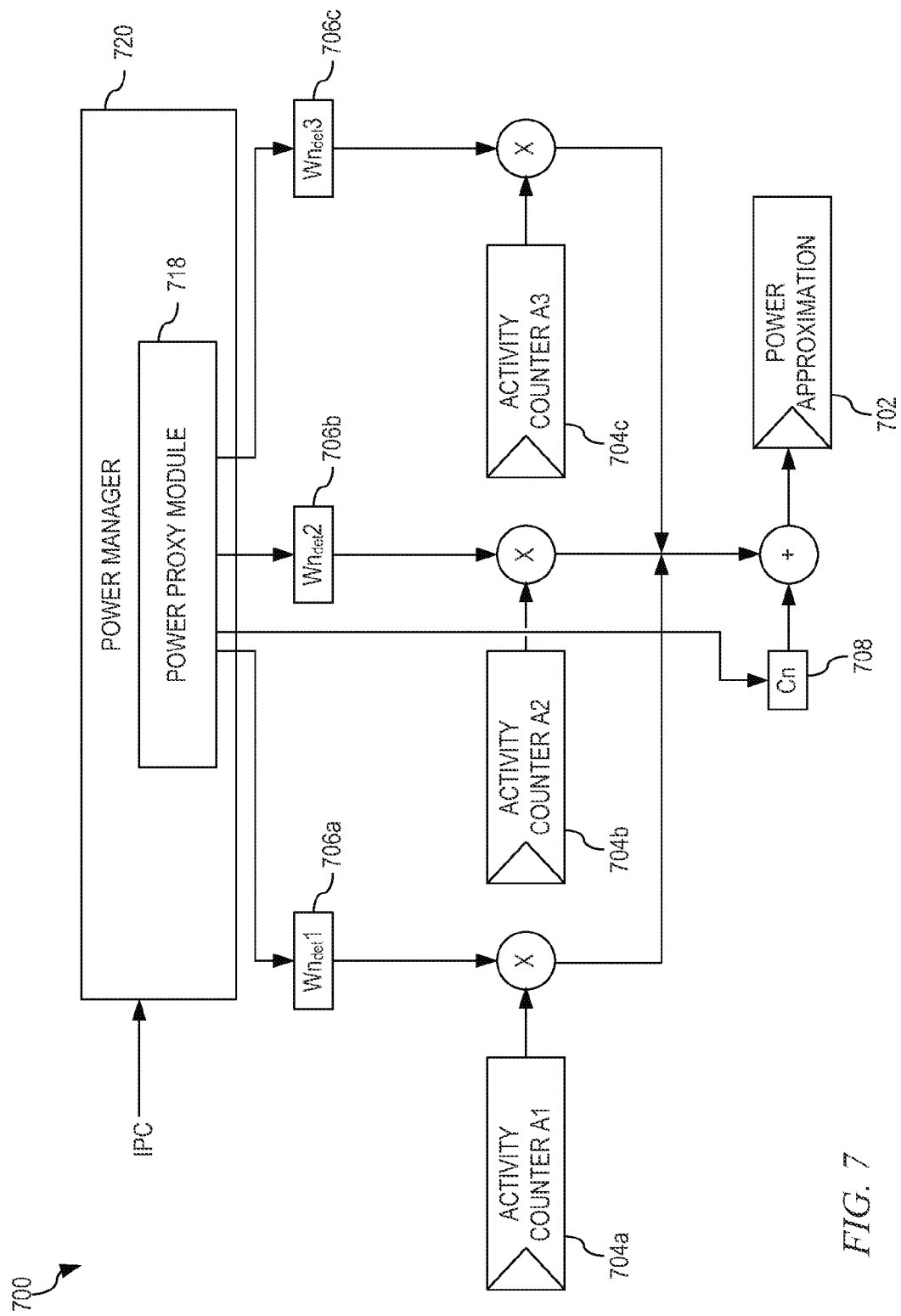
FIG. 7 depicts an identification of weights to be used by a plurality of activity counters and a constant to be added to the power approximation may be identified by a control power proxy module within a power manager in accordance an illustrative embodiment.

While the examples shown in FIG. 4-6 use preset weights and constants that are directly used and/or a plurality of predetermined weights and a plurality of predetermined constants that are selected based on instructions completed per cycle of the application that is being executed by a core, the illustrative embodiments are not limited to using only predetermined weights. That is, rather than using preset or predetermined weights and constants and control logic within the power proxies to determine which weight or constant should be selected, a decision as to which weight should be used by each activity counter and which constants should be added to the power approximation may be made by a power manager, such as power manager 310 of FIG. 3. That is, as is illustrated in FIG. 7, an identification of weights 706a, 706b, and 706c to be used by each of activity counters 704a, 704b, and 704c and constant 708 to be added to the power approximation may be identified by a control power proxy module 718 within power manager 720 in accordance with an illustrative embodiment.

For simplicity, this example approximates power 702 from three activity counters 704a, 704b, and 704c, three dynamically identified weights 706a, 706b, and 706c, and one dynamically identified constant value 708. In data processing system 700, power proxy module 718 receives inputs that correlate to conditions related to the application being executed on a specific core, such as instructions completed per cycle, number of threads in operation, voltage, temperature, voltage leakage, or the like. During execution of the application, power proxy module 718 receives the input, for example, instructions completed per cycle related to the application being executed. Based on the received instructions completed per cycle, power proxy module 718 then determines a weight to be used for each of activity counters 704a, 704b, and 704c as well as a constant to be added to the power approximation.

Depending on the instructions completed per cycle range, a plurality of different weights and constant values may then be used by the power proxy architecture. For example, if power proxy module 718 determines that the instructions completed per cycle are less than or equal to a first predetermined value, then power proxy module 718 may identify a first set of weights and a first constant such that the power for activity counters 704a, 704b, and 704c may be approximated using the following model:

$$P=Wy_{det}1*A1+Wy_{det}2*A2+Wy_{det}3*A3+C_{det}1$$

If power proxy module 718 determines that the instructions completed per cycle are greater than the first predetermined value but less than or equal to a second predetermined value, then power proxy module 718 may identify a second set of weights and a second constant such that the power for activity counters 704a, 704b, and 704c may be approximated using the following model:

$$P=Wz_{det}1*A1+Wz_{det}2*A2+Wz_{det}3*A3+C_{det}2$$

If power proxy module 718 determines that the instructions completed per cycle are greater than the second predetermined value but less than or equal to a third predetermined value, then power proxy module 718 may identify a third set of weights and a third constant such that the power for activity counters 704*a*, 704*b*, and 704*c* may be approximated using the following model:

$$P = Wc_{det}1*A1 + Wc_{det}2*A2 + Wc_{det}3*A3 + C_{det}3$$

Finally, if power proxy module 718 determines that the instructions completed per cycle are greater than the third predetermined value, then power proxy module 718 may identify a fourth set of weights and a fourth constant such that the power for activity counters 704*a*, 704*b*, and 704*c* may be approximated using the following model:

$$P = Wd_{det}1*A1 + Wd_{det}2*A2 + Wd_{det}3*A3 + C_{det}4$$

While FIG. 7 illustrates only four different instructions completed per cycle ranges, one of ordinary skill in the art will recognize that more or fewer instructions completed per cycle ranges may be used without departing from the spirit and scope of the invention.

Thus far, FIGS. 4-7 have depicted data processing systems where various power proxies comprise attribute counters that are multiplied with their associated weight and then the results are added together along with a constant to approximate the power being used by the various activities being executed in a processor core. However, rather than each of the power proxies performing these computations, the computations may be performed directly with a power manager, such as power manager 310 of FIG. 3. That is, rather than a weight being selected by control logic, such as control logic 410, 510, or 610 of FIGS. 4, 5, and 6, or by a power proxy module, such as power proxy module 718 of FIG. 7, identifying a weight to a power proxy, all of the computations may be made directly within the power manager.

Figure 8:
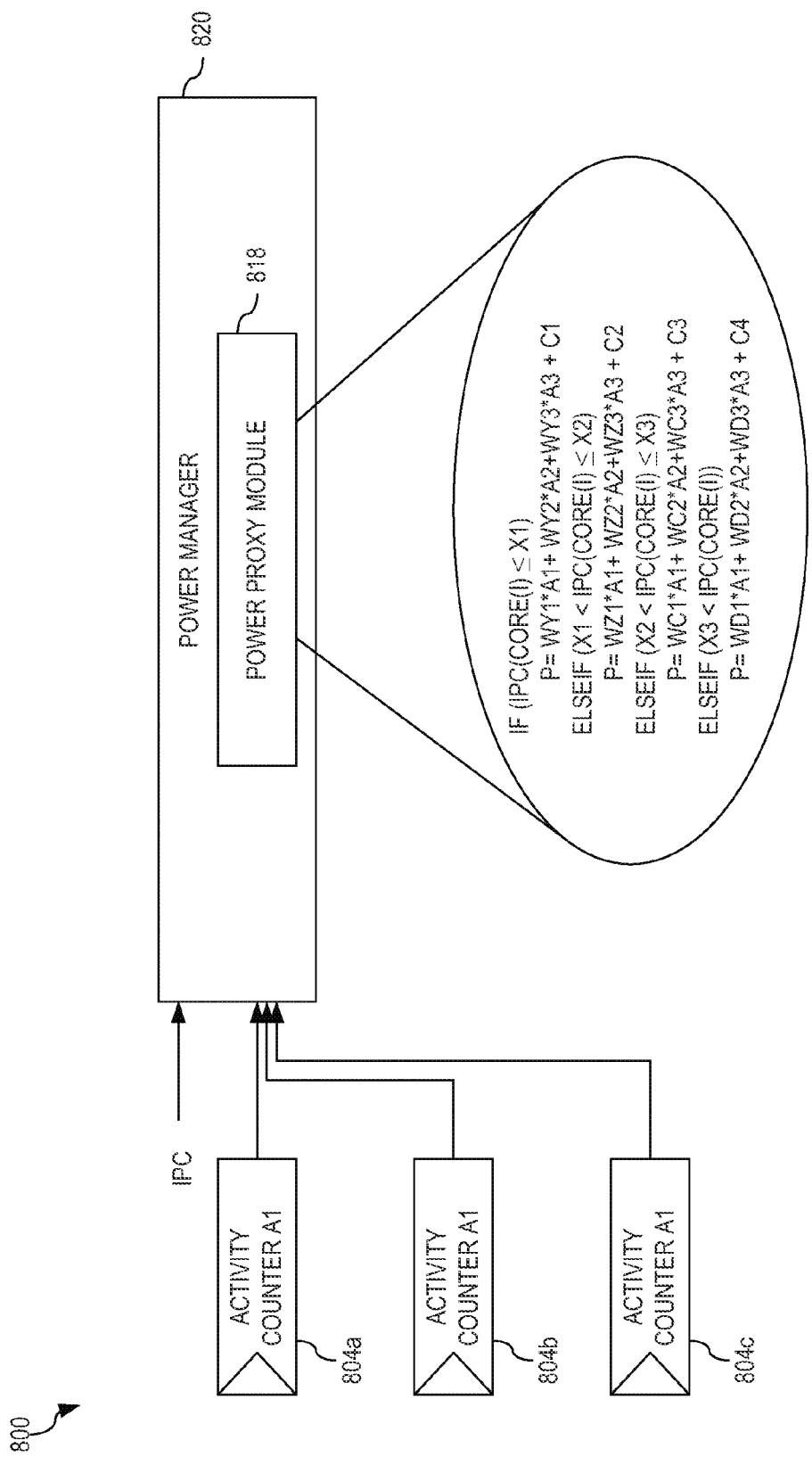
FIG. 8 depicts an exemplary data processing system where a power manager performs all computations previously performed by power proxies in accordance with an illustrative embodiment.

FIG. 8 depicts an exemplary data processing system where a power manager performs all computations previously performed by power proxies in accordance with an illustrative embodiment. Data processing system 800 comprises activity counters 804*a*, 804*b*, and 804*c* that track activities within their respective cores and caches. At regular intervals or when signaled to do so by power manager 820, each of these activity counters may send the respective counts to power manager 820 and then reset on activity read from power manager 820. Also at regular intervals or when requested by power manager 820, conditions related to the application being executed on a specific core, such as instructions completed per cycle, number of threads in operation, voltage, temperature, voltage leakage, or the like, may be received by power manager 820.

During execution of the application, power proxy module 818 receives the input, for example, instructions completed per cycle related to the application being executed. Based on the received instructions completed per cycle, power proxy module 818 then determines a weight to be used for each of activity counters 804*a*, 804*b*, and 804*c* as well as a constant to be added to the power approximation. Rather than sending the identified weights and constant back to the power proxy unit, power manager 818 performed the computations directly, similar to the computations previously performed by the power proxy of FIG. 7, and is not reproduced here for simplicity.

Up to this point, all of the exemplary computation models have been linear models. However, the illustrative embodiments are not limited to only linear computation models such as $P = \Sigma(Wi*Ai) + C$. That is, in other illustrative embodiments, other models may be used to approximate the power being consumed by the activities being performed on a processor core. That is, some activities in a processor core may have anon-linear aspect. In such cases, where activity counts are received for those non-linear activities, a power manager may either determine which power approximation model should be used for power approximation or may actual generate a power approximation model based on the attributes that are received.

For example, as described in the examples above, each of the activity counters provide a count of the activities to the power proxy unit or to the power manager. When, for example, the power manager receives three activity counts, A1, A2, and A3, the power manager may determine whether the activity associated with each of these activity counts is either linear or non-linear. If activity A1 is linear and activity A2 and A3 are non-linear activities, then the power manager may determine whether there is an existing computation model in a plurality of stored computation models to be used for power approximation using the linear and non-linear activity counts. In the event there is an existing computation model to be used for power approximation using the linear and non-linear activity counts, then the power manager selects the computation model and uses the computation model for power approximation in one of the methods previously described.

If however, a previously stored computation module using the linear and non-linear activity counts fails to exist, the power manager may generate a computation model based on the parameters associated with the activities. For example, for linear activity A1, the power manager may use the linear parameter to identify a computation that activity A1 should be multiplied by weight W1. For non-linear activity A2, the power manager may use the non-linear parameter to identify a computation that a tog of activity A2 should be multiplied by weight W2, and the power manager may use the non-linear parameter to identify a computation that a log of activity A3 should be multiplied by weight W3. Thus, a computation module may be generated such that the power may be approximated using the following equation.

$$P = W1*A1 + W2*\log(A2) + W3*\log(A3) + C$$

Once the computation model is generated, the power manager may proceed to storing the computation module in the plurality of stored computation models.

Figure 9A:
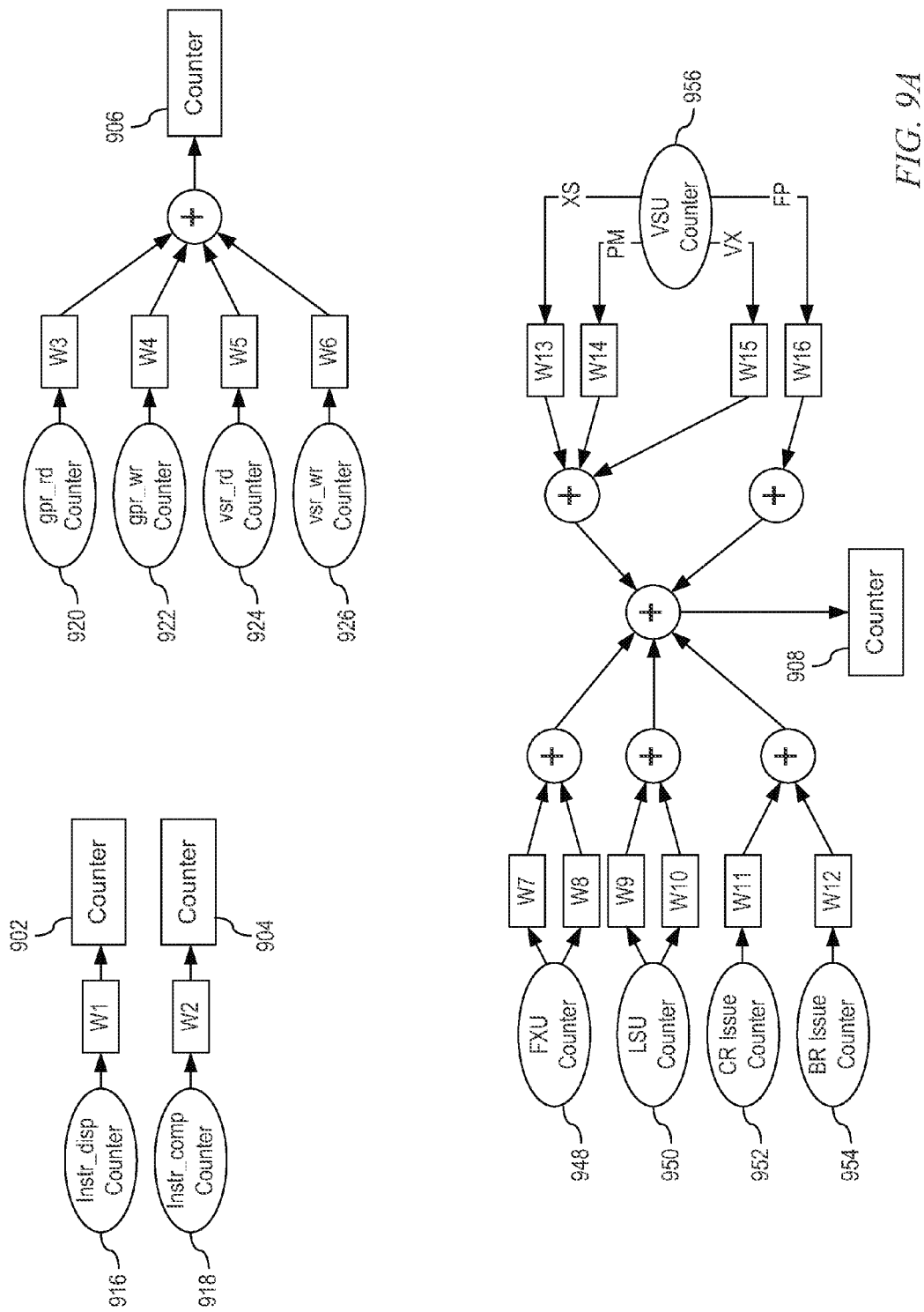
FIGS. 9A and 9B illustrate a block diagram of exemplary core activity counting in accordance with an illustrative embodiment.
Figure 9B:
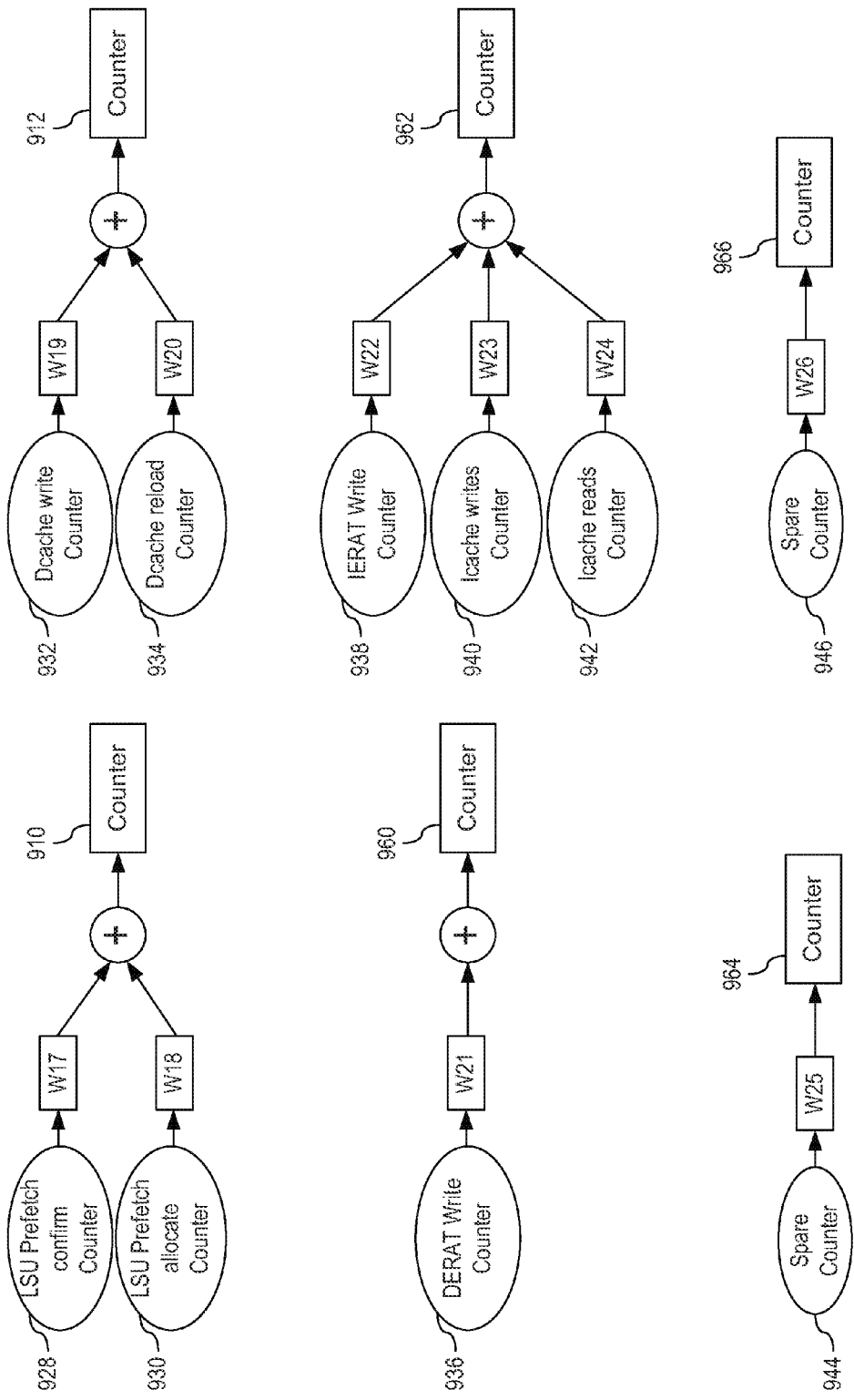
Figure 10:
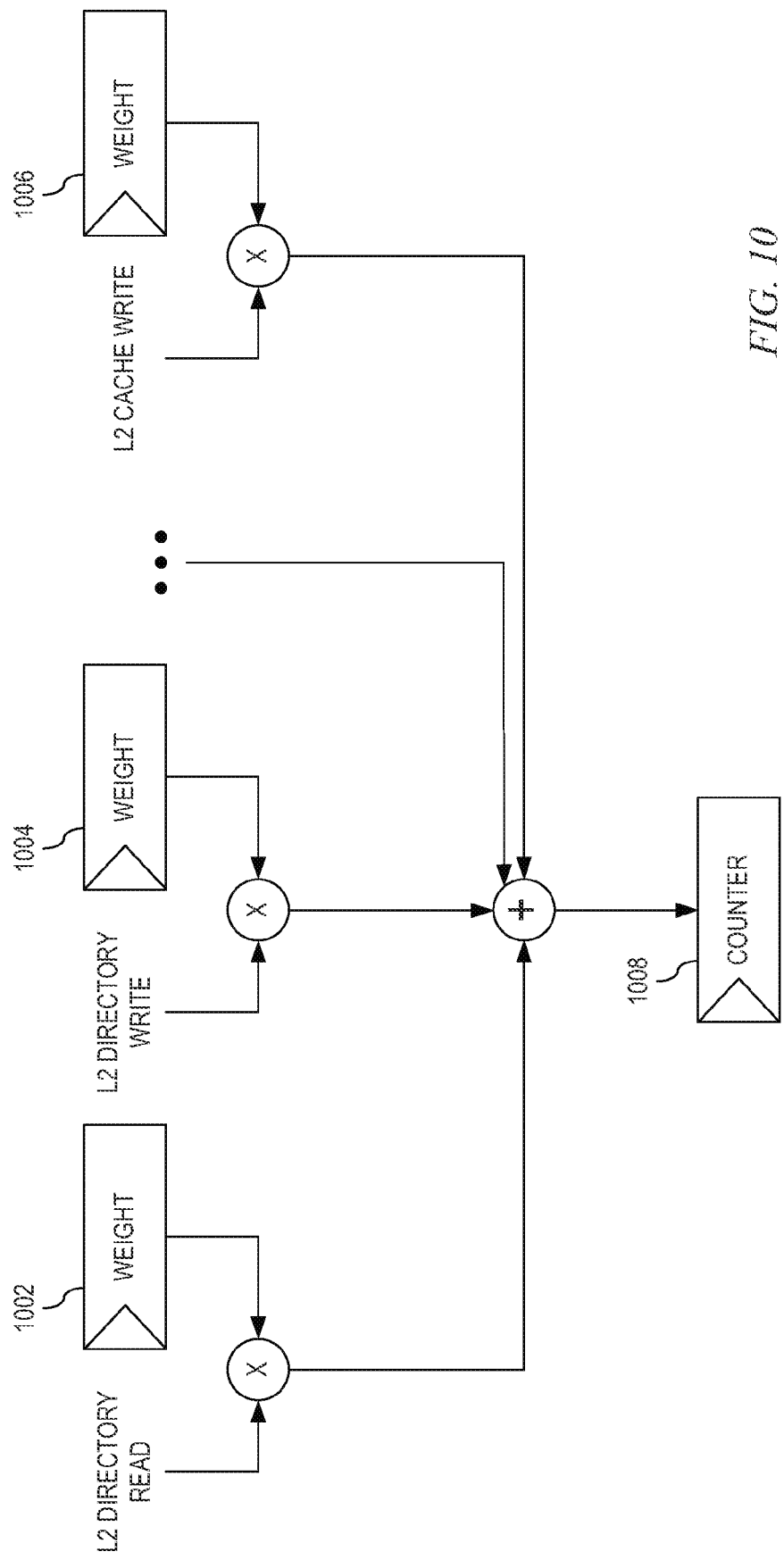
FIG. 10 illustrates a block diagram of exemplary L2 cache activity counting in accordance with an illustrative embodiment.

Hereafter, FIGS. 9 and 10 provide examples of a power proxy unit and activity counting in order to provide more realistic description of the complexity of power proxy units and the activities that are counted. FIGS. 9A and 9B illustrate a block diagram of exemplary core activity counting in accordance with an illustrative embodiment. The activities illustrated in FIGS. 9A and 9B are examples of activities to be counted and eventually stored as a value as core power proxy. Counters 902-956 and 960-966 are counters in a power proxy unit, such as power proxy unit 328 of FIG. 3. In one illustrative embodiment, before being stored in counters, the power proxy unit may divide the values that are to be stored in counters 916-926 by a certain value prior to storing the value in counters 916-926. Dynamically set weights W1-W26 are weights associated with the activities being counted. In an illustrative embodiment, weights W1-W26 are four (4) bit values.

Instr_disp counter 916 counts instructions dispatched and instr_comp counter 918 counts instructions completed. The power proxy unit multiplies the count in instr_disp counter 916 by weight W1 and then this total value is stored in counter 902. The power proxy unit multiplies the count in instr_comp counter 918 by weight W2 and then this total value is stored in counter 904.

Gpr_rd counter 920 counts general purpose register reads (gpr_rd), gpr_wr counter 922 counts general purpose register writes (gpr_wr), vsr_rd counter 924 counts vector register file reads (vsr_rd), and vsr_wr counter 926 counts vector register file writes (vsr_wr). The power proxy unit multiplies the count in gpr_rd counter 920 by weight W3 and then sums this total value with the total value of the count in gpr_wr counter 922 multiplied by weight W4 and the total value of the count in vsr_rd counter 924 multiplied by weight W5 and the total value of the count in vsr_wr counter 926 multiplied by weight W6 stored in counter 906.

LSU prefetch confirm counter 928 stores a count of LSU prefetches confirmed. LSU prefetch allocate counter 930 stores a count of LSU prefetches allocated. Counter 910 stores a value equal to the count in LSU prefetch confirm counter 928 multiplied by weight W17 summed with the count from LSU prefetch allocate counter 930 multiplied by weight W18. Counter 960 stores a value equal to the count in DERAT write counter 936 multiplied by weight W21.

Dcache write counter 932 stores a count of data cache writes. Dcache reload counter 934 stores a count of data cache reloads. Counter 912 stores a value equal to the sum of the count in Dcache write counter 932 multiplied by weight W19 and the count in Dcache reload counter 934 multiplied by weight W20.

Icache writes counter 940 stores count of instruction cache writes. Icache reads counter 942 stores a count of instruction cache reads. IERAT write counter 938 stores a count of IERAT writes. Counter 962 stores a value equal to the sum of the count in IERAT write counter 938 multiplied by weight W22, the count in Icache writes counter 940 multiplied by weight W23, and the count in Icache reads counter 942 multiplied by weight W24.

FXU counter 948 stores a count of various instructions issued to an FXU unit, such as FXUA 218 of FIG. 2. The power proxy unit multiplies the count of these instructions by a corresponding weight, such as weight W7 and W8, forming adjusted values. The power proxy unit sums the adjusted values together with the adjusted values from the other counters and stores the summed value in counter 908. For example, weight W7 may correspond to instructions to multiply while weight W8 may correspond to instructions to divide. LSU counter 950 stores a count of load instructions issued plus a count of store instructions issued. The power proxy unit multiplies the count of load instructions issued by a weight W9 and multiplies the count of store instructions issued by a weight of W10, forming adjusted values. The power proxy unit sums the adjusted values together with the adjusted values from the other counters stored in counter 908. CR issue counter 952 stores a count of control register instructions issued. The power proxy unit multiplies the count of control register instructions issued by a weight W11, forming an adjusted value. The power proxy unit sums the adjusted values together with the adjusted values from the other counters stored in counter 908, BR issue counter 954 stores a count of branch instructions issued. The power proxy unit multiplies the count of branch instructions issued by a weight W12, forming an adjusted value. The power proxy unit sums the adjusted values together with the adjusted values from the other counters stored in counter 908.

VSU counter 956 stores a count of activities, which includes activities performed by both VSU 226 and FPU 222 of FIG. 2, only some of which are shown in FIGS. 9A and 9B. In the present example, VSU counter 956 stores a count equal to a sum of the count of permutation (PM) operations plus a count of floating point (FP) operations plus a count of simple vector (XS) operations plus a count of complex vector (VX) operations. The power proxy unit multiplies the count of the various operations by a corresponding weight, weight W13- W16, summed together and then sums the adjusted values from the other counters and stores the value in counter 908.

Spare counters 944 and 946 represent additional activities that may be assigned a weight, W25 and W26, and tracked, depending upon a determination made by an authorized user, such as a designer. The power proxy unit sums together counters 902-912 and 960-966 and stores the summed value. Periodically, the power proxy unit multiplies and a power manager, such as power manager 310 of FIG. 3, collects the summed values.

FIG. 10 illustrates a block diagram of exemplary L2 cache activity counting in accordance with an illustrative embodiment. While FIG. 10 shows L2 directory reads, L2 directory writes, and L2 cache writes as activities being counted and monitored, other activities including L2 cache targeted reads and L2 cache full reads may be counted and monitored. Further, while FIG. 10 shows L2 cache activities being counted, the process illustrated in FIG. 10 applies to L3 cache activities as well. Counter 1008 comprises the sum of a count of L2 directory read operations multiplied by dynamically set weight 1002 plus a count of L2 directory write operations multiplied by dynamically set weight 1004 plus a count of L2 cache write operations multiplied by dynamically set weight 1006. Periodically, the power proxy unit multiplies and collects the value of counter 1008 by a power manager, such as power manager 310 of FIG. 3.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 11:
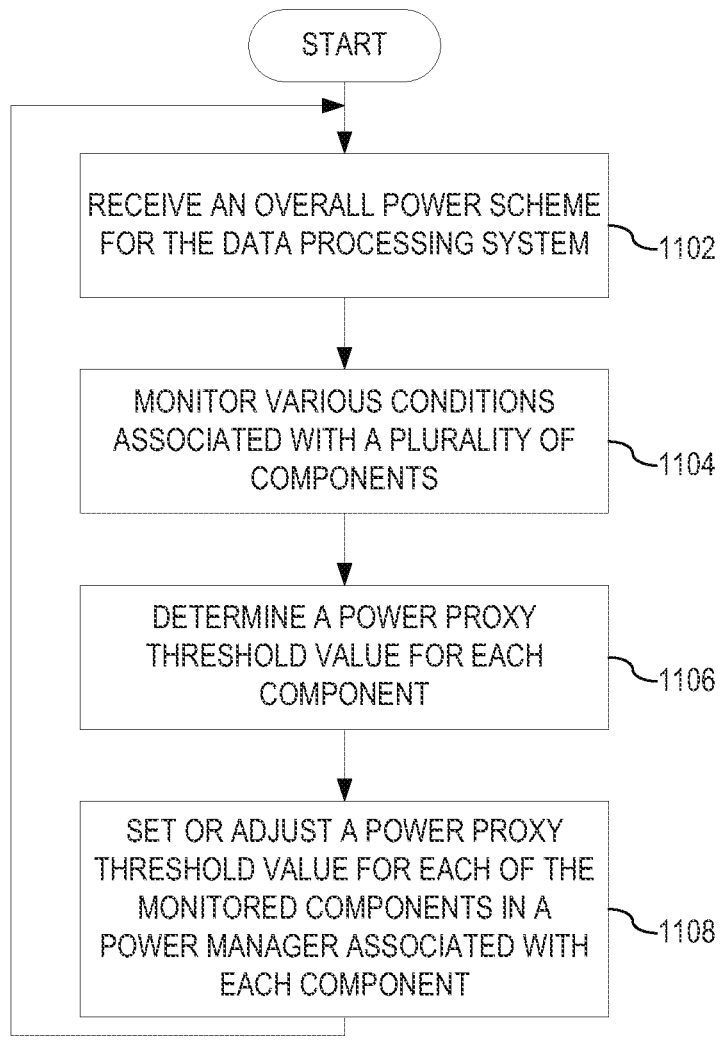
FIG. 11 is a flow diagram illustrating an exemplary operation performed by a high-level power management controller in accordance with an illustrative embodiment.

FIG. 11 is a flow diagram illustrating an exemplary operation performed by a high-level power management controller in accordance with an illustrative embodiment. The operation of FIG. 11 may be implemented in a high-level power management controller, such as high-level power management controller 302 of FIG. 3. As the operation begins, the high-level power management controller receives an overall power scheme for the data processing system in which the high-level power management controller resides (step 1102). The high-level power management controller then monitors various conditions associated with a set of components on a set of microprocessors (step 1104). The various conditions may comprise the voltage consumed by each component, the temperature of areas associated with each of the components, voltage leakage associated with each of the components, or the like. Using information pertaining to the temperature, voltage consumption, voltage leakage, or the like, for one or more of the components in the data processing system along with a power scheme for data processing system the high-level power management controller determines a power proxy threshold value for each component (step 1106). The high-level power management controller then sets or adjusts a power proxy threshold value for each of the monitored components in a power manager associated with each component (step 1108). The operation then returns to step 1102 where high-level power management controller may receive a new overall power scheme and/or new information regarding the temperature, voltage consumption, voltage leakage, or the like, for one or more of the components in the data processing system.

Figure 12:
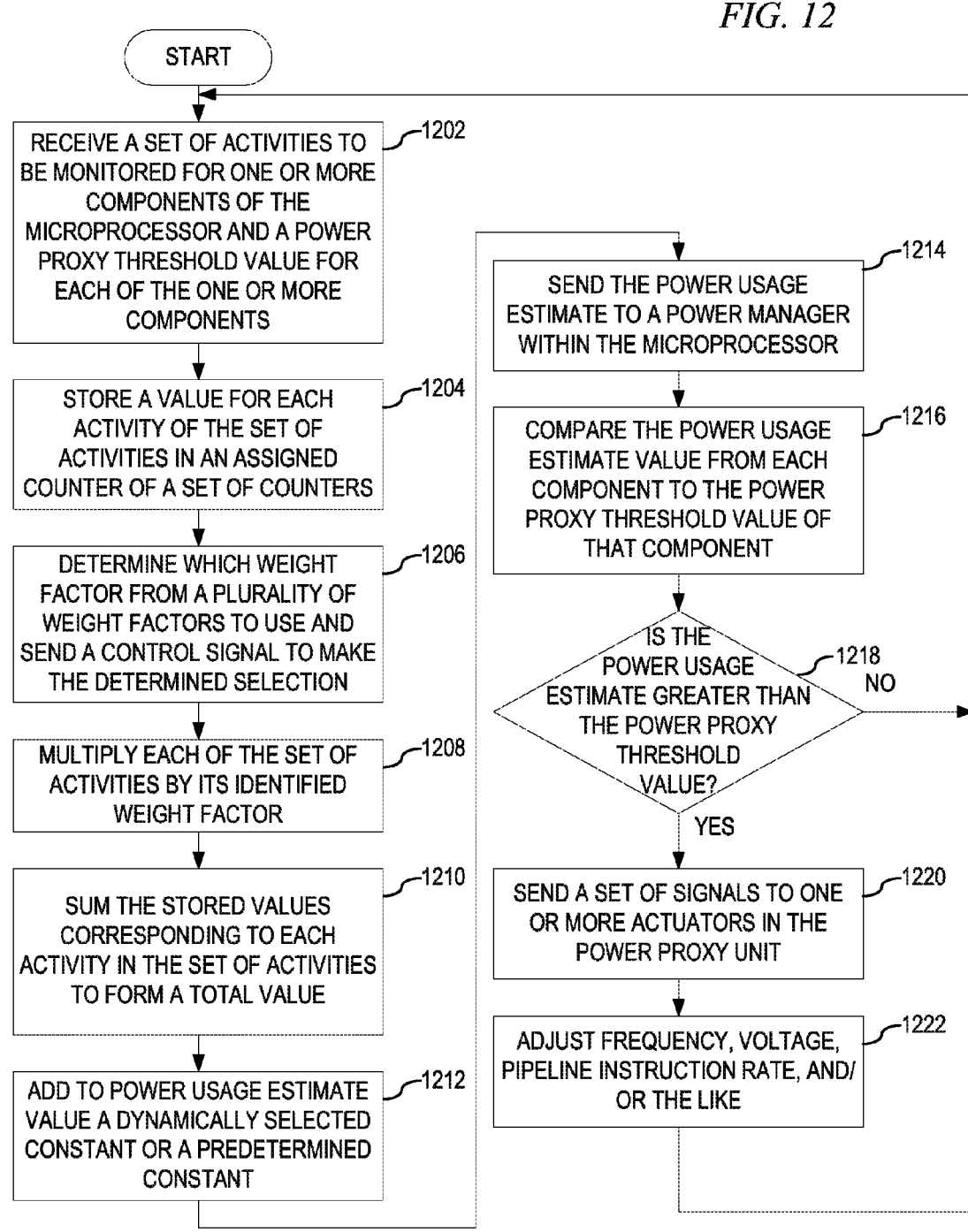
FIG. 12 is a flowchart illustrating an exemplary operation performed within a microprocessor in accordance with an illustrative embodiment.

FIG. 12 is a flowchart illustrating an exemplary operation performed within a microprocessor in accordance with an illustrative embodiment. The operation of FIG. 12 may be implemented in a microprocessor, such as microprocessor 304, 306, and/or 308 of FIG. 3. As the operation begins, a power manager within the microprocessor receives a set of activities to be monitored for one or more components of the microprocessor and a power proxy threshold value for each of the one or more components (step 1202). A power proxy unit for each monitored component stores a value for each activity of the set of activities in an assigned counter of a set of counters, forming a set of stored values, wherein each stored value comprises the count of the activity that will be multiplied by a weight factor specific to the activity (step 1204).

Prior to multiplying each of the stored values for each of the subset of activities to its associated weight factor, for each subset of activities, the power proxy unit determines the weight factor that will be used. The weight factor may be either a dynamically selected weight factor or a predetermined weight factor. If the weight factor used for a subset of activities is a dynamically selected weight factor, the control logic in the power proxy unit may determine the dynamically selected weight factor based on conditions related to the application being executed on the specific core to which the power proxy unit is associated, such as instructions completed per cycle, number of threads in operation, voltage, temperature, voltage leakage, or the like. Based on the conditions related to the application being executed on the specific core, the control logic may determine which weight factor from a plurality of weight factors to use and send a control signal to make the determined selection (step 1206).

The power proxy unit then multiplies the total value for each stored value by the identified weight factor that corresponds to the activity (step 1208). The power proxy unit sums the stored values corresponding to each activity in the set of activities to form a total value for the set of activities (step 1210). While summing the stored values for the set of activities to form a power usage estimate value, the power proxy unit may also add to power usage estimate value a dynamically selected constant or a predetermined constant (step 1212). Similar to determining the dynamically selected weight factor, the control logic in the power proxy unit may determine the dynamically selected constant based on conditions related to the application being executed on the specific core to which the power proxy unit is associated, such as instructions completed per cycle, number of threads in operation, voltage, temperature, voltage leakage, or the like.

The power proxy unit then sends the power usage estimate value to a power manager within the microprocessor (step 1214). The power manager compares the power usage estimate value from each component to the power proxy threshold value of that component (step 1216). The power manager then determines if the power usage estimate value from the component is greater than the power proxy threshold value for that component (step 1218). If at step 1218 the power usage estimate value from the component is greater than the power proxy threshold value for that component, then the power manager sends a set of signals to one or more on-chip actuators in the power proxy unit (step 1220). That is, based on the comparison, if the power usage estimate value exceeds the cap, then the power manager may send signals for the set of on-chip actuators to adjust a set of operational parameters in the power proxy unit to decrease the frequency, voltage, and/or pipeline instruction rate of the component.

The set of on-chip actuators in the power proxy unit adjusts frequency, voltage, pipeline instruction rate, and/or the like, based on the received signals (step 1222), with the operation returning to step 1202 thereafter. If at step 1218 the power usage estimate value from the component is less than the power proxy threshold value for that component, then the operation returns to step 1202. That is, based on the comparison, if the power usage is not being exceeded, the power manager may send signals for the set of on-chip actuators in the power proxy unit to increase the frequency, voltage, and/or pipeline instruction rate of the component or do not perform any action at all.

Figure 13:
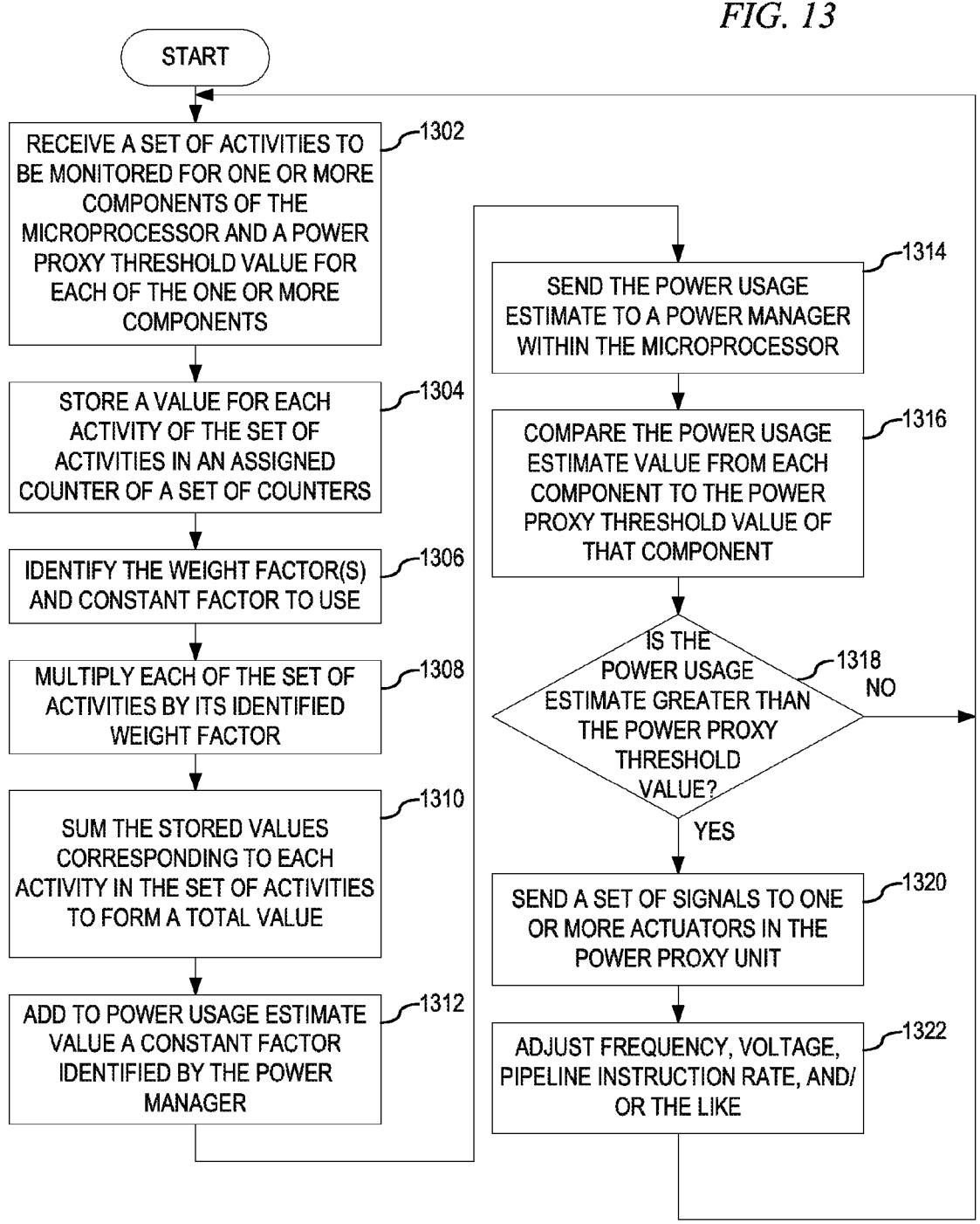
FIG. 13 is a flowchart illustrating another exemplary operation performed within a microprocessor in accordance with an illustrative embodiment.

FIG. 13 is a flowchart illustrating another exemplary operation performed within a microprocessor in accordance with an illustrative embodiment. The operation of FIG. 13 may be implemented in a microprocessor, such as microprocessor 304, 306, and/or 308 of FIG. 3. As the operation begins, a power manager within the microprocessor receives a set of activities to be monitored for one or more components of the microprocessor and a power proxy threshold value for each of the one or more components (step 1302). A power proxy unit for each monitored component stores a value for each activity of the set of activities in an assigned counter of a set of counters, forming a set of stored values, wherein the value comprises the count will be multiplied by a weight factor specific to the activity (step 1304).

Prior to multiplying each of the stored values for each of the subset of activities to its associated weight factor, for each subset of activities, the power manager determines the weight factor that will be used. In this example, rather than using preset or predetermined weights and constants and control logic within the power proxies to determine which weight or constant should be selected, a decision as to which weight should be used by each activity counter and which constants should be added to the power approximation may be made by a power manager, such as power manager 310 of FIG. 3. The weight factor and constant factor may be based on conditions related to the application being executed on the specific core to which the power proxy unit is associated, such as instructions completed per cycle, number of threads in operation, voltage, temperature, voltage leakage, or the like. Based on the conditions related to the application being executed on the specific core, the power manager may identify the weight factor and constant factor to use (step 1306).

The power proxy unit then multiplies the total value for each stored value by the identified weight factor that corresponds to the activity (step 1308). The power proxy unit sums the stored values corresponding to each activity in the set of activities to form a total value for the set of activities (step 1310). While summing the stored values for the set of activities to form a power usage estimate value, the power proxy unit also adds to power usage estimate value the constant factor identified by power manager (step 1312).

The power proxy unit then sends the power usage estimate value to a power manager within the microprocessor (step 1314). The power manager compares the power usage estimate value from each component to the power proxy threshold value of that component (step 1316). The power manager then determines if the power usage estimate value from the component is greater than the power proxy threshold value for that component (step 1318). If at step 1318 the power usage estimate value from the component is greater than the power proxy threshold value for that component, then the power manager sends a set of signals to one or more on-chip actuators in the power proxy unit (step 1320). That is, based on the comparison, if the power usage estimate value exceeds the cap, then the power manager may send signals for the set of on-chip actuators to adjust a set of operational parameters in the power proxy unit to decrease the frequency, voltage, and/or pipeline instruction rate of the component.

The set of on-chip actuators in the power proxy unit adjusts frequency, voltage, pipeline instruction rate, and/or the like, based on the received signals (step 1322), with the operation returning to step 1302 thereafter. If at step 1318 the power usage estimate value from the component is less than the power proxy threshold value for that component, then the operation returns to step 1302. That is, based on the comparison, if the power usage is not being exceeded, the power manager may send signals for the set of on-chip actuators in the power proxy unit to increase the frequency, voltage, and/or pipeline instruction rate of the component or do not perform any action at all.

Figure 14:
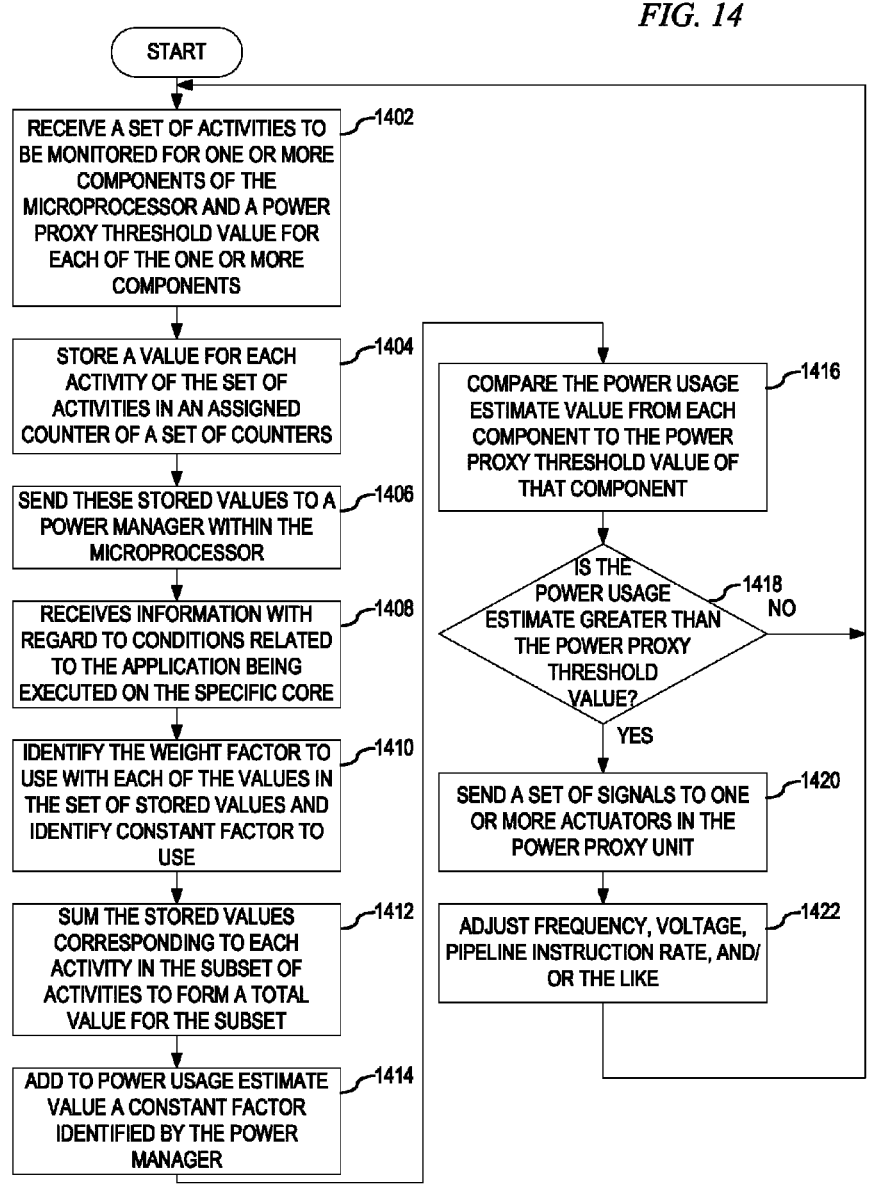
FIG. 14 is a flowchart illustrating a further exemplary operation performed within a microprocessor in accordance with an illustrative embodiment.

FIG. 14 is a flowchart illustrating a further exemplary operation performed within a microprocessor in accordance with an illustrative embodiment. The operation of FIG. 14 may be implemented in a microprocessor, such as microprocessor 304, 306, and/or 308 of FIG. 3. As the operation begins, a power manager within the microprocessor receives a set of activities to be monitored for one or more components of the microprocessor and a power proxy threshold value for each of the one or more components (step 1402). A power proxy unit for each monitored component stores a value for each activity of the set of activities in an assigned counter of a set of counters, forming a set of stored values (step 1404). The power proxy unit then sends these stored values to a power manager within the microprocessor (step 1406). The power manager also receives information with regard to conditions related to the application being executed on the specific core to which the power proxy unit is associated, such as instructions completed per cycle, number of threads in operation, voltage, temperature, voltage leakage, or the like (step 1408).

Based on the conditions related to the application being executed on the specific core, the power manager may identify the weight factor with each of the values in the set of stored values and constant factor to use. (step 1410). The power manager then sums the stored values corresponding to each activity in the subset of activities to form a total value for the subset (step 1412). The power proxy unit sums the scaled value of each subset to form a power usage estimate value, adding to power usage estimate value an identified constant (step 1414). The identified constant may be identified by the power manager based on conditions related to the application being executed on the specific core to which the power proxy unit is associated, such as instructions completed per cycle, number of threads in operation, voltage, temperature, voltage leakage, or the like.

The power manager compares the power usage estimate value from each component to the power proxy threshold value of that component (step 1416). The power manager then determines if the power usage estimate value from the component is greater than the power proxy threshold value for that component (step 1418). If at step 1418 the power usage estimate value from the component is greater than the power proxy threshold value for that component, then the power manager sends a set of signals to one or more on-chip actuators in the power proxy unit (step 1420). That is, based on the comparison, if the power usage estimate value exceeds the cap, then the power manager may send signals for the set of on-chip actuators to adjust a set of operational parameters in the power proxy unit to decrease the frequency, voltage, and/or pipeline instruction rate of the component.

The set of on-chip actuators in the power proxy unit adjusts frequency, voltage, pipeline instruction rate, and/or the like, based on the received signals (step 1422), with the operation returning to step 1402 thereafter. If at step 1418 the power usage estimate value from the component is less than the power proxy threshold value for that component, then the operation returns to step 1402.

Figure 15:
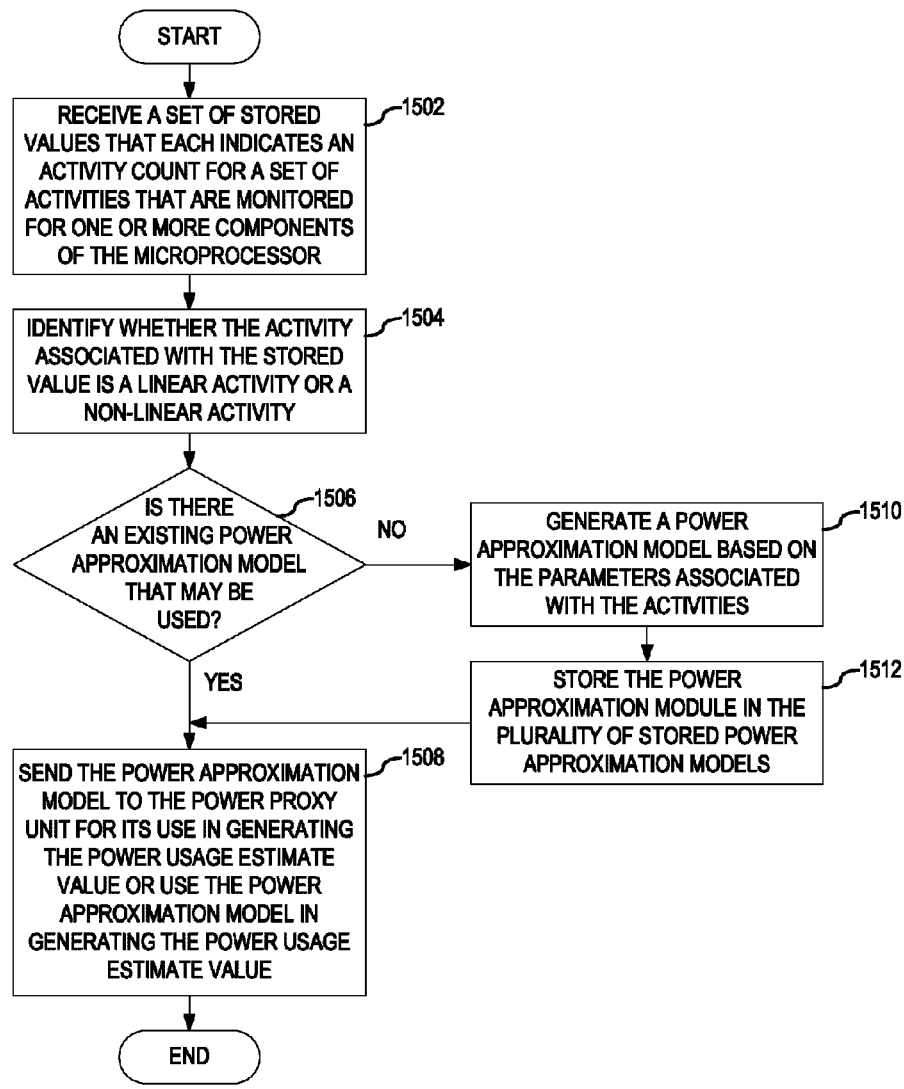
FIG. 15 is a flowchart illustrating an exemplary operation performed within a microprocessor for determining a model to be used for power approximation in accordance with an illustrative embodiment.

FIG. 15 is a flowchart, illustrating an exemplary operation performed within a microprocessor for determining a model to be used for power approximation in accordance with an illustrative embodiment. As the operation begins, a power manager receives a set of stored values that each indicates an activity count for a set of activities that are monitored for one or more components of the microprocessor (step 1502). For each of the stored values, the power manager identifies whether the activity associated with the stored value is a linear activity or a non-linear activity (step 1504). Once an identification is made as to the linear or non-linear aspect of the activity associated with each stored value, the power manager determines whether there is an existing power approximation model in a plurality of stored power approximation models that may be used to generate the power usage estimate value (step 1506). If at step 1506 the power manager identifies an existing power approximation model, then the power manager may either send the power approximation model to the power proxy unit for its use in generating the power usage estimate value as is described in FIGS. 12 and 13 or may use the power approximation model itself in generating the power usage estimate value as is described in FIG. 14 (step 1508), with the operation ending thereafter.

If at step 1506 the power manager fails to identify an existing power approximation model, then the power manager may generate a power approximation model based on the parameters associated with the activities (step 1510). That is, for example, for linear activity A1, the power manager may use the linear parameter to identify a computation that activity A1 should be multiplied by weight W1. For non-linear activity A2, the power manager may use the non-linear parameter to identify a computation that a tog of activity A2 should be multiplied by weight W2, and the power manager may use the non-linear parameter to identify a computation that a log of activity A3 should be multiplied by weight W3. Thus, a power approximation module may be generated such that the power may be approximated using the following equation.

$$P=W1*A1+W2*\log(A2)+W3*\log(A3)+C$$

Once the power approximation model is generated, the power manager may store the power approximation module in the plurality of stored power approximation models (step 1512). Then the operation proceeds to step 1508 where the power manager may either send the power approximation model to the power proxy unit for its use in generating the power usage estimate value as is described in FIGS. 12 and 13 or may use the power approximation model itself in generating the power usage estimate value as is described in FIG. 14, with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for dynamically adapting power proxy architectures across different applications as well as within an application. The described dynamic approach tackles the problem of dynamically tuning programmable aspects of the power proxy architecture during run-time. One of the key programmable element of power proxy architecture is the weight assigned to each activity counts. For example, in the case where power is de fined as P=Σ(Wi*Ai)+C each of the weights (Wi) may be programmed based on the feedback gathered from the program during run-time. Such a scheme has the advantage of improving accuracy of the power proxy architecture. Another aspect of dynamic approach utilizes different models for power proxy architecture. Assuming an underlying hardware where different models of power approximation are implemented, the dynamic approach can also decide which model to use to have better accuracy. Depending on the model type, a better fit is possible and the dynamic approach decides which model to use depending on the program phase.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for automatically tuning power proxy architectures, the method comprising:
   identifying a set of conditions related to an application being executed on a microprocessor core;
   based on the set of conditions, identifying a weight factor to use for each activity in a set of activities being monitored for the microprocessor core, thereby forming a set of weight factors;
   generating a power usage estimate value using the set of activities and the set of weight factors, wherein the power usage estimate value is generated using the set of activities, the set of weight factors, and at least one of a linear model of the set of activities, a non-linear model of the set of activities or a linear/non-linear combination model of the set of activities;
   determining whether the power usage estimate value is greater than a power proxy threshold value identifying a maximum power usage for the microprocessor core;
   responsive to the power usage estimate value being greater than the power proxy threshold value, sending a set of signals to one or more on-chip actuators in the power proxy unit associated with the microprocessor core; and
   adjusting a set of operational parameters associated with the component in order to meet the defined power target value.

2. The method of claim 1, wherein the set of operational parameters is at least one of frequency, voltage, or pipeline instruction rate.

3. The method of claim 1, wherein the set of conditions comprises instructions completed per cycle, number of threads in operation, voltage, temperature, or voltage leakage.

4. The method of claim 1, wherein the weight factor to use for each activity is selected from a set of predetermined weight factors.

5. The method of claim 1, wherein the weight factor to use for each activity is a dynamically determined weight factor.

6. The method of claim 1, wherein the power usage estimate value is generated using the set of activities, the set of weight factors, and a constant that is determined based on the set of conditions.

7. The method of claim 1, wherein identifying the power usage estimate value for the microprocessor further comprises:
   identifying the set of activities to be monitored for the microprocessor;
   storing a value for each activity of the set of activities in an assigned counter of a first set of counters, forming a set of stored values;
   multiplying each of the set of stored values by an associated weight factor, thereby forming a set of scaled values; and
   summing the set of scaled values to form the power usage estimate value.

8. A computer program product comprising a non-transitory computer readable storage medium having a computer readable program stored therein, wherein the computer readable program, when executed on a computing device, causes the computing device to:
   identify a set of conditions related to an application being executed on a microprocessor core;
   based on the set of conditions, identify a weight factor to use for each activity in a set of activities being monitored for the microprocessor core, thereby forming a set of weight factors;
   generate a power usage estimate value using the set of activities and the set of weight factors, wherein the power usage estimate value is generated using the set of activities, the set of weight factors, and at least one of a linear model of the set of activities, a non-linear model of the set of activities, or a linear/non-linear combination model of the set of activities;
   determine whether the power usage estimate value is greater than a power proxy threshold value identifying a maximum power usage for the microprocessor core;
   responsive to the power usage estimate value being greater than the power proxy threshold value, send a set of signals to one or more on-chip actuators in the power proxy unit associated with the microprocessor core; and
   adjust a set of operational parameters associated with the component in order to meet the defined power target value.

9. The computer program product of claim 8, wherein the set of operational parameters is at least one of frequency, voltage, or pipeline instruction rate.

10. The computer program product of claim 8, wherein the set of conditions comprises instructions completed per cycle, number of threads in operation, voltage, temperature, or voltage leakage.

11. The computer program product of claim 8, wherein the weight factor to use for each activity is selected from a set of predetermined weight factors.

12. The computer program product of claim 8, wherein the weight factor to use for each activity is a dynamically determined weight factor.

13. The computer program product of claim 8, wherein the power usage estimate value is generated using the set of activities, the set of weight factors, and a constant that is determined based on the set of conditions.

14. The computer program product of claim 8, wherein the computer readable program to identify the power usage estimate value for the microprocessor further causes the computing device to:
   identify the set of activities to be monitored for the microprocessor;
   store a value for each activity of the set of activities in an assigned counter of a first set of counters, forming a set of stored values;
   multiply each of the set of stored values by an associated weight factor, thereby forming a set of scaled values; and
   sum the set of scaled values to form the power usage estimate value.

15. An apparatus, comprising:
   a processor; and
   a memory coupled to the processor, wherein the memory comprises instructions which, when executed by the processor, cause the processor to:
   identify a set of conditions related to an application being executed on a microprocessor core;

based on the set of conditions, identify a weight factor to use for each activity in a set of activities being monitored for the microprocessor core, thereby forming a set of weight factors;

generate a power usage estimate value using the set of activities and the set of weight factors, wherein the power usage estimate value is generated using the set of activities, the set of weight factors, and at least one of a linear model of the set of activities, a non-linear model of the set of activities, or a linear/non-linear combination model of the set of activities;

determine whether the power usage estimate value is greater than a power proxy threshold value identifying a maximum power usage for the microprocessor core;

responsive to the power usage estimate value being greater than the power proxy threshold value, send a set of signals to one or more on-chip actuators in the power proxy unit associated with the microprocessor core; and adjust a set of operational parameters associated with the component in order to meet the defined power target value.

16. The apparatus of claim 15, wherein the set of operational parameters is at least one of frequency, voltage, or pipeline instruction rate.

17. The apparatus of claim 15, wherein the set of conditions comprises instructions completed per cycle, number of threads in operation, voltage, temperature, or voltage leakage.

18. The apparatus of claim 15, wherein the weight factor to use for each activity is selected from a set of predetermined weight factors.

19. The apparatus of claim 15, wherein the weight factor to use for each activity is a dynamically determined weight factor.

20. The apparatus of claim 15, wherein the power usage estimate value is generated using the set of activities, the set of weight factors, and a constant that is determined based on the set of conditions.

21. The apparatus of claim 15, wherein the instructions to identify the power usage estimate value for the microprocessor further cause the processor to:

identify the set of activities to be monitored for the microprocessor;

store a value for each activity of the set of activities in an assigned counter of a first set of counters, forming a set of stored values;

multiply each of the set of stored values by an associated weight factor, thereby forming a set of scaled values; and sum the set of scaled values to form the power usage estimate value.

* * * * *